US009127614B2

(12) United States Patent
Ueno et al.

(10) Patent No.: US 9,127,614 B2
(45) Date of Patent: Sep. 8, 2015

(54) TORQUE-CALCULATING CONTROL SYSTEM FOR AN INTERNAL COMBUSTION ENGINE

(71) Applicant: HONDA MOTOR CO., LTD., Tokyo (JP)

(72) Inventors: Masaki Ueno, Wako (JP); Masaya Agata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/028,619

(22) Filed: Sep. 17, 2013

(65) Prior Publication Data

US 2014/0088851 A1  Mar. 27, 2014

(30) Foreign Application Priority Data

Sep. 25, 2012  (JP) .................. 2012-210602

(51) Int. Cl.
*F02D 41/30*   (2006.01)
*F02D 41/10*   (2006.01)
(Continued)

(52) U.S. Cl.
CPC ............ *F02D 41/30* (2013.01); *F02D 41/0002* (2013.01); *F02D 41/005* (2013.01);
(Continued)

(58) Field of Classification Search
CPC ............... F02D 2041/1412; F02D 2200/0402; F02D 2200/0625; F02D 2200/1004; F02D 2250/18; F02D 35/027; F02D 41/0002; F02D 41/10; F02D 41/1406; F02P 5/1521; Y02T 10/42; Y02T 10/46
USPC ............ 123/376, 403, 406.52, 679, 681, 683, 123/687, 704; 701/101–103, 110
See application file for complete search history.

(56) References Cited

U.S. PATENT DOCUMENTS 4,458,651 A * 7/1984 Inoue et al. .................... 123/492
4,745,553 A * 5/1988 Raven et al. ................... 701/104
(Continued)

FOREIGN PATENT DOCUMENTS

DE        103 22 509 A1    12/2003
DE   10 2008 046 405 A1     7/2009
(Continued)

OTHER PUBLICATIONS

Examiner's Decision to the Effect that a Patent is to be Granted dated May 20, 2014 corresponding to Japanese Patent Application No. 2012-210602 and English translation thereof.
(Continued)

*Primary Examiner* — Erick Solis
*Assistant Examiner* — Carl Staubach
(74) *Attorney, Agent, or Firm* — Squire Patton Boggs (US) LLP

(57) ABSTRACT

A control system for an internal combustion engine, which is capable of directly and properly calculating the most fuel-efficient torque according to operating conditions of the engine without setting or learning in advance operating lines indicative of the most fuel-efficient torques, thereby making it possible to reduce costs and enhance fuel economy. In the control system, when the engine is operated at a predetermined reference rotational speed, a plurality of fuel consumption ratio parameters associated with a plurality of estimated torques are calculated based on a provisional intake air amount-estimated torque relationship which is the relationship between provisional intake air amounts and estimated torques to be obtained when the provisional intake air amounts of intake air are supplied. Further, an estimated torque associated with a minimum value of the fuel consumption ratio parameters is calculated as the most fuel-efficient torque at the reference rotational speed.

16 Claims, 16 Drawing Sheets

(51) Int. Cl.
    *F02D 41/14*     (2006.01)
    *F02P 5/152*     (2006.01)
    *F02D 41/00*     (2006.01)
    *F02D 35/02*     (2006.01)

(52) U.S. Cl.
    CPC .......... *F02D 41/10* (2013.01); *F02D 41/1406* (2013.01); *F02P 5/1521* (2013.01); *F02D 35/027* (2013.01); *F02D 2041/001* (2013.01); *F02D 2041/1412* (2013.01); *F02D 2200/0402* (2013.01); *F02D 2200/0625* (2013.01); *F02D 2200/1004* (2013.01); *F02D 2250/18* (2013.01); *Y02T 10/42* (2013.01); *Y02T 10/46* (2013.01); *Y02T 10/47* (2013.01)

(56) References Cited

U.S. PATENT DOCUMENTS

| | | | | |
|---|---|---|---|---|
| 6,178,943 | B1* | 1/2001 | Taga et al. | 123/295 |
| 6,957,139 | B2* | 10/2005 | Bellinger | 701/104 |
| 7,206,689 | B1* | 4/2007 | Johnson | 701/103 |
| 7,844,387 | B2* | 11/2010 | Bauer et al. | 701/103 |
| 8,306,720 | B2* | 11/2012 | Yamazaki et al. | 701/103 |
| 2004/0235614 | A1* | 11/2004 | Tajima et al. | 477/3 |
| 2012/0136519 | A1* | 5/2012 | Suzuki | 701/22 |
| 2013/0131940 | A1* | 5/2013 | Yamamoto et al. | 701/54 |
| 2014/0060485 | A1* | 3/2014 | Ueno et al. | 123/344 |
| 2014/0067212 | A1* | 3/2014 | Ueno et al. | 701/54 |

FOREIGN PATENT DOCUMENTS

| | | |
|---|---|---|
| JP | 04-194340 A | 7/1992 |
| JP | 2002-332884 A | 11/2002 |
| JP | 3518168 B2 | 4/2004 |
| JP | 3614134 B2 | 1/2005 |
| JP | 2006-193137 A | 7/2006 |

OTHER PUBLICATIONS

German Search Report file No. 10 2013 218 969.9 issued Dec. 18, 2013.

* cited by examiner

F I G. 1 3
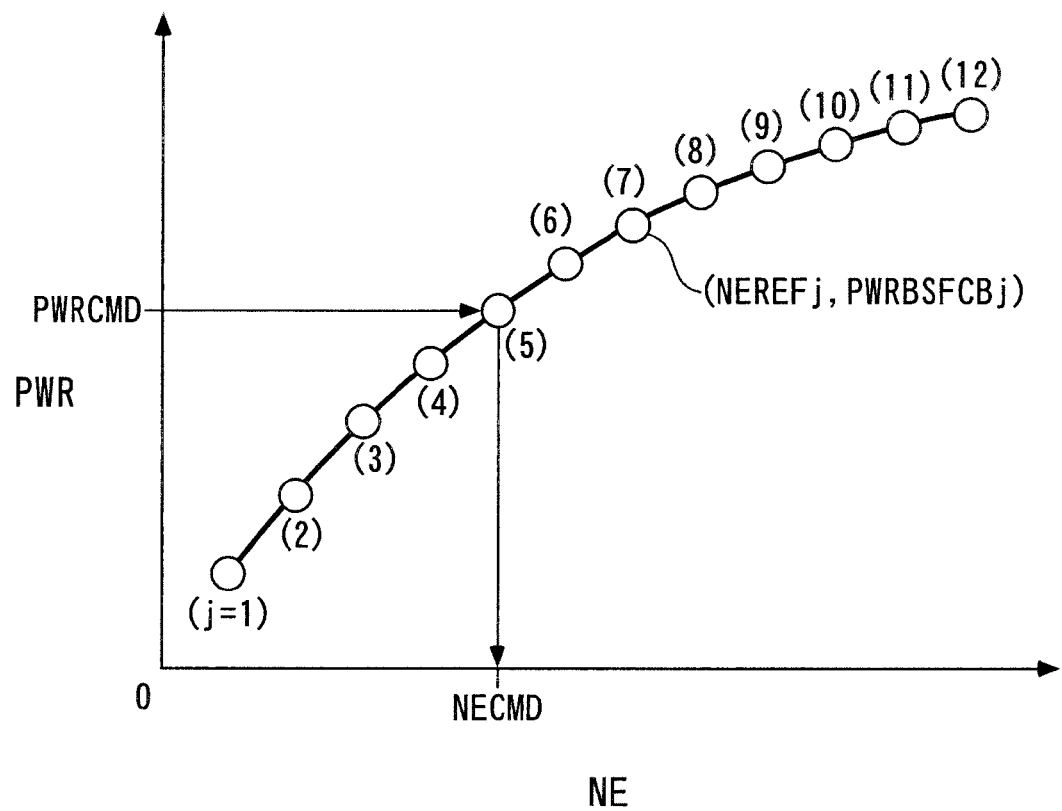

TORQUE-CALCULATING CONTROL SYSTEM FOR AN INTERNAL COMBUSTION ENGINE

BACKGROUND OF THE INVENTION

1. Field of the Invention

The present invention relates to a control system for an internal combustion engine, for controlling the engine based on the most fuel-efficient torque.

2. Description of the Related Art

A conventional control system for an internal combustion engine of this type is disclosed in Japanese Laid-Open Patent Publication (Kokai) No. 2006-193137. This control system controls an internal combustion engine installed on a hybrid vehicle, based on operating lines which represent torque minimizing a fuel consumption ratio with respect to the rotational speed of the engine (most fuel-efficient torque), while performing control for learning and updating the operating lines. Specifically, the control system sets in advance an operating line for each set of environmental conditions, such as an outside air temperature, atmospheric pressure and humidity, on a coordinate plane in which the torque and rotational speed of the engine are set as coordinate axes, and stores each operating line as one of a plurality of predetermined operating lines. Further, during operation of the engine, the control system calculates the fuel consumption ratio based on detected torque of the engine and the rotational speed and fuel injection amount thereof. When the calculated fuel consumption ratio is smaller than a fuel consumption ratio indicated by an operating line associated with the set of environmental conditions at the time, the operating line is updated using the calculated fuel consumption ratio.

As described above, in the above conventional control system, the engine is controlled based the predetermined operating lines. Therefore, particularly when the operating lines are set on an environmental condition set basis, it is required to set in advance a large number of operating lines, which increases the number of setting steps to thereby increase costs of the control system. Further, unless the set of environmental conditions are met, an operating line associated with the set of environmental conditions is not learned, and hence the engine is sometimes controlled based on an unlearned operating line using the most fuel-efficient torque deviated from an optimum value. In this case, fuel economy is degraded.

SUMMARY OF THE INVENTION

It is an object of the present invention to provide a control system for an internal combustion engine, which is capable of directly and properly calculating the most fuel-efficient torque according to operating conditions of the engine without setting in advance or learning operating lines indicative of the most fuel-efficient torque, thereby making it possible to reduce costs of the control system and enhance fuel economy of the engine.

To attain the above object, the present invention provides a control system for an internal combustion engine, which calculates a most fuel-efficient torque that minimizes a fuel consumption ratio, and controls the engine based on the calculated most fuel-efficient torque, comprising air-fuel ratio control means for controlling an air-fuel ratio of a mixture burned in a combustion chamber to a predetermined target air-fuel ratio, and most fuel-efficient torque-calculating means for calculating the most fuel-efficient torque generated when the engine is operated at one predetermined reference rotational speed, wherein the most fuel-efficient torque-calculating means comprises maximum intake air amount-calculating means for calculating, based on operating conditions of the engine, a maximum amount of intake air that can be drawn into the combustion chamber, as a maximum intake air amount, provisional intake air amount-setting means for setting a plurality of provisional intake air amounts different from each other within a range of an intake air amount, which ranges from 0 to the calculated maximum intake air amount, estimated torque-calculating means for calculating, based on the operating conditions of the engine, estimated torques that are estimated to be output from the engine assuming that the set plurality of provisional intake air amounts of intake air are drawn into the combustion chamber, respectively, as a plurality of estimated torques, provisional intake air amount-estimated torque relationship-setting means for setting a provisional intake air amount-estimated torque relationship, which is a relationship between the plurality of provisional intake air amounts and the plurality of calculated estimated torques, and fuel consumption ratio-calculating means for calculating a plurality of fuel consumption ratios associated with the plurality of estimated torques, respectively, based on the set provisional intake air amount-estimated torque relationship, wherein one of the plurality of estimated torques, associated with a minimum fuel consumption ratio of the plurality of calculated fuel consumption ratios, is calculated as the most fuel-efficient torque at the reference rotational speed.

With the configuration of this control system, the air-fuel ratio of the mixture is controlled to the predetermined target air-fuel ratio, and the most fuel-efficient torque (torque of the engine which minimizes the fuel consumption ratio) generated when the engine is operated at the one predetermined reference rotational speed is calculated based on the operating conditions of the engine by the most fuel-efficient torque-calculating means, as follows: First, the maximum amount of intake air that can be drawn into the combustion chamber is calculated based on the operating conditions of the engine, and the plurality of provisional intake air amounts are set within the range of the maximum intake air amount. Next, the plurality of estimated torques that are estimated to be output from the engine assuming that the plurality of provisional intake air amounts of intake air are drawn into the combustion chamber are calculated, respectively, based on operating conditions of the engine at the time, and the provisional intake air amount-estimated torque relationship, which is the relationship between the calculated provisional intake air amounts and the calculated estimated torques. Then, based on the set provisional intake air amount-estimated torque relationship, the fuel consumption ratios associated with the estimated torques are calculated, respectively, and one of the estimated torques, associated with the minimum one of the calculated fuel consumption ratios, is calculated as the most fuel-efficient torque at the reference rotational speed.

As described above, the relationship between the provisional intake air amounts and the estimated torques of the engine associated therewith is set as the provisional intake air amount-estimated torque relationship, based on the operating conditions of the engine. Further, the present invention is based on preconditions that the air-fuel ratio of the mixture is controlled to the predetermined target air-fuel ratio, that is, a ratio between the intake air amount and the fuel amount is fixed, and therefore the provisional intake air amount-estimated torque relationship set as described above directly represents the relationship between the fuel amount and the torque of the engine.

Therefore, it is possible to properly calculate a plurality of fuel consumption ratios associated with a plurality of estimated torques, based on the provisional intake air amount-estimated torque relationship. Further, one of the estimated torques, associated with the minimum one of the calculated fuel consumption ratios, is calculated as the most fuel-efficient torque, whereby it is possible to properly calculate the most fuel-efficient torque at a reference rotational speed while directly reflecting operating conditions of the engine at the time on the calculation of the most fuel-efficient torque, without causing delayed learning as in the conventional control system. As a consequence, by controlling the engine based on the appropriate most fuel-efficient torque, it is possible to enhance fuel economy. Further, differently from the conventional control system, there is no need to set or update in advance operating lines indicative of the most fuel-efficient torques, which makes it possible to reduce the costs of the control system.

Preferably, the most fuel-efficient torque-calculating means calculates a plurality of most fuel-efficient torques generated when the engine is operated at a plurality of predetermined reference rotational speeds including the one reference rotational speed, respectively, and the most fuel-efficient torque-calculating means further comprises operating line-setting means for setting an operating line connecting a plurality of operating points, which are respective combinations of the plurality of reference rotational speeds and the plurality of most fuel-efficient torques associated with the plurality of reference rotational speeds, on a coordinate plane defined by coordinate axes representing a rotational speed and a torque of the engine are set as.

With the configuration of the preferred embodiment, the plurality of most fuel-efficient torques with respect to the plurality of reference rotational speeds are calculated, respectively, and the operating line connecting the operating points, which are respective combinations of the reference rotational speeds and the most fuel-efficient torques, is set on the coordinate plane defined by the coordinate axes representing the rotational speed and the torque of the engine. Therefore, from the operating line, it is possible to easily select a combination of a rotational speed and a torque of the engine, from which the most fuel-efficient torque can be obtained, and which are suitable for controlling the engine.

Preferably, the control system further comprises target output-setting means for setting a target output of the engine, and target torque-setting means for selecting a combination of a torque and a rotational speed of the engine which satisfy the set target output, based on the operating line, and setting the torque and the rotational speed as a target torque and a target rotational speed.

With the configuration of the preferred embodiment, it is possible to easily select the combination of the torque and the rotational speed of the engine which satisfy the set target output of the engine, based on the operating line set as described above, and properly set the torque and the rotational speed as the target torque and the target rotational speed.

Preferably, the control system further comprises target intake air amount-setting means for setting a minimum provisional intake air amount that makes the estimated torque equal to or close to the target torque, as the target intake air amount, by selecting the minimum provisional intake air amount from the provisional intake air amount-estimated torque relationship set with respect to the reference rotational speed associated with the target rotational speed.

With the configuration of the preferred embodiment, the minimum provisional intake air amount that makes the estimated torque equal to or close to the target torque is selected from the provisional intake air amount-estimated torque relationship set with respect to the reference rotational speed associated with the target rotational speed, and the selected minimum provisional intake air amount is set as the target intake air amount. Therefore, also when there are a plurality of solutions to the intake air amount for attaining one target torque, it is possible to positively select a minimum intake air amount without causing hunting of the intake air amount. Then, by setting the selected minimum intake air amount as the target intake air amount, it is possible to improve fuel economy. Further, since the provisional intake air amount-estimated torque relationship set in advance for calculation of the most fuel-efficient torque is used, it is possible to easily set the target intake air amount with small computational load.

Preferably, the target intake air amount-setting means sequentially searches the plurality of provisional intake air amounts in an increasing order of the provisional intake air amounts based on the provisional intake air amount-estimated torque relationship, for the provisional intake air amount that makes the estimated torque equal to or close to the target torque, and terminates the search of the provisional intake air amounts when the provisional intake air amount that makes the estimated torque equal to or close to the target torque is found, while setting the found provisional intake air amount as the target intake air amount.

With the configuration of the preferred embodiment, the provisional intake air amounts are sequentially searched in an increasing order of the provisional intake air amounts for the provisional intake air amount that makes the estimated torque equal to or close to the target torque, and when the provisional intake air amount that makes the estimated torque equal to or close to the target torque is found, the search of the provisional intake air amounts is terminated while setting the found provisional intake air amount as the target intake air amount. Therefore it is possible to positively select a minimum intake air amount that attains one target torque. Further, since the search for the provisional intake air amount is terminated when the provisional intake air amount is found, and no further search is performed, it is possible to reduce computational load.

Preferably, the control system further comprises estimated torque characteristic curve-setting means for setting an estimated torque characteristic curve representative of characteristics of the plurality of estimated torques with respect to the plurality of provisional intake air amounts, based on the provisional intake air amount-estimated torque relationship set with respect to the reference rotational speed associated with the target rotational speed, torque non-increase-determining means for determining whether or not there is a non-increasing point at which the estimated torque ceases to increase even when the provisional intake air amount increases, on the set estimated torque characteristic curve, limit torque-setting means for setting, when it is determined that there is a non-increasing point, the estimated torque corresponding to the non-increasing point as a limit torque, and target intake air amount-setting means for setting, when the target torque is larger than the limit torque, the provisional intake air amount corresponding to the non-increasing point as the target intake air amount.

With the configuration of the preferred embodiment, the estimated torque characteristic curve representative of characteristics of the plurality of estimated torques with respect to the plurality of provisional intake air amounts is set based on the provisional intake air amount-estimated torque relationship set with respect to the reference rotational speed associated with the target rotational speed. Further, it is determined whether or not there is a non-increasing point (point on the estimated torque characteristic curve, at which the estimated torque ceases to increase even when the provisional intake air amount increases) on the set estimated torque characteristic curve. The non-increasing point includes a maximum point corresponding to a maximum value where the estimated torque clearly changes from increase to decrease as the provisional intake air amount increases, or a starting point of a section where the estimated torque is substantially constant instead of increasing when the section exists. If it is determined that there is a non-increasing point at which the estimated torque ceases to increase, the estimated torque corresponding to the non-increasing point is set as the limit torque. When the target torque is larger than the limit torque, the provisional intake air amount corresponding to the non-increasing point is set as the target intake air amount.

As described above, in the case where there is a non-increasing point at which the estimated torque ceases to increase, on the set estimated torque characteristic curve, when a target torque, which is larger than the limit torque corresponding to the non-increasing point, is set, the target intake air amount is limited to the provisional intake air amount corresponding to the non-increasing point. This prevents setting of the target intake air amount exceeding the non-increasing point, thereby making it possible to effectively avoid consumption of excessive fuel which does not contribute to an increase in the torque of the engine, which makes it possible to improve fuel economy. Further, in the case where the non-increasing point at which the estimated torque ceases to increase is a maximum point, if the intake air amount is increased beyond the maximum point, not only fuel is wastefully consumed but also the torque of the engine is reduced, and hence by limiting the target intake air amount as mentioned above, it is possible to effectively prevent reduction of the torque of the engine, thereby making it possible to enhance drivability.

Preferably, the control system further comprises torque re-increase-determining means for determining whether or not there is a re-increasing point at which the estimated torque, which increases again, becomes equal to or larger than the limit torque within a range of the provisional intake air amount larger than a value corresponding to the non-increasing point on the estimated torque characteristic curve, and in a case where it is determined that there is the re-increasing point, when the target torque is larger than the limit torque, the target intake air amount-setting means sets the provisional intake air amount larger than a value corresponding to the re-increasing point as the target intake air amount in place of the provisional intake air amount corresponding to the non-increasing point.

With the configuration of the preferred embodiment, it is determined whether or not there is a re-increasing point at which the estimated torque increases again and becomes equal to or larger than the limit torque within the range of the provisional intake air amount larger than the value corresponding to the non-increasing point on the estimated torque characteristic curve. In a case where it is determined that there is a re-increasing point, when the target torque is larger than the limit torque, the provisional intake air amount larger than the value corresponding to the re-increasing point is set as the target intake air amount in place of the provisional intake air amount corresponding to the non-increasing point. This makes it possible to meet a demand from the driver of the vehicle as much as possible to cause the engine to output a larger torque, whereby it is possible to enhance drivability.

More preferably, the control system further comprises provisional target throttle valve opening-calculating means for calculating a provisional target throttle valve opening, which is a provisional target of an opening degree of a throttle valve for adjusting the intake air amount, according to the target intake air amount, and target throttle valve opening-setting means for setting a target throttle valve opening, which is a final target value of the opening degree of the throttle valve, to the provisional target throttle valve opening, when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

When the throttle valve has the effective valve opening described above, as a characteristic thereof, the torque of the engine almost ceases to increase even when the opening degree of the throttle valve becomes larger than the effective valve opening. Therefore, if the opening degree of the throttle valve is controlled according to the target torque in a range beyond the effective valve opening, this makes hunting liable to occur in which a controlled variable of (amount of change in) the opening degree of the throttle valve becomes very large with respect to the target torque, and the service lives of the throttle valve and an actuator thereof are shortened by such hunting. With the configuration of the preferred embodiment, when the provisional target throttle valve opening calculated according to the target intake air amount exceeds the effective valve opening, the target throttle valve opening is limited and set to the effective valve opening, so that it is possible to prevent hunting of the opening degree of the throttle valve from being caused in the range beyond the effective valve opening, to thereby prolong the service lives of the throttle valve and the actuator thereof.

Preferably, the engine is installed on a vehicle as a motive power source, the control system further comprising accelerator pedal opening-detecting means for detecting a degree of opening of an accelerator pedal of the vehicle, and when the detected degree of opening of the accelerator pedal is in a fully-open state, and also the target air-fuel ratio is set to a richer value than a stoichiometric air-fuel ratio, the target throttle valve opening-setting means sets the target throttle valve opening to a predetermined wide-open throttle opening.

With the configuration of the preferred embodiment, when the accelerator pedal opening is in a fully-open state, by causing the engine to output the maximum torque according to a driver's demand for acceleration, it is possible to enhance drivability. In this case, under conditions where the target air-fuel ratio is set to a richer value than the stoichiometric air-fuel ratio, the safety margin for knock is increased by a cooling effect provided by heat of evaporation of an increased amount of fuel in the combustion chamber, so that even when the target throttle valve opening is set to the wide-open throttle opening, there is no fear of occurrence of conspicuous knocking.

More preferably, the control system further comprises knocking-detecting means for detecting a state of occurrence of knocking in the engine, and estimated retard amount-calculating means for calculating an estimated retard amount in ignition timing according to the detected state of occurrence of knocking, and the estimated torque-calculating means calculates the estimated torque according to the calculated estimated retard amount of the ignition timing.

When the ignition timing is retarded, knocking is suppressed, but the combustion efficiency and the torque of the engine are reduced, and the degree of the reduction varies with a retard amount of the ignition timing. Therefore, the retard amount of the ignition timing has large influence not only on the relationship between the provisional intake air amount and the estimated torque but also on existence or non-existence of the non-increasing point on the estimated torque characteristic curve. With the configuration of the preferred embodiment, the estimated torque is calculated according to the calculated estimated retard amount of the ignition timing, and hence it is possible to more accurately set the provisional intake air amount-estimated torque relationship and the estimated torque characteristic curve while causing the degree of reduction of the engine torque dependent on the retard amount to be reflected thereon. Further, it is possible to more properly determine whether or not the non-increasing point exists on the estimated torque characteristic curve. As a consequence, it is possible to more accurately control the engine.

The above and other objects, features, and advantages of the present invention will become more apparent from the following detailed description taken in conjunction with the accompanying drawings.

BRIEF DESCRIPTION OF THE DRAWINGS

FIG. 13 is a view showing the relationship between a reference engine speed and a most fuel-efficient output, set based on the operating line;

DETAILED DESCRIPTION OF PREFERRED EMBODIMENTS

Figure 1:
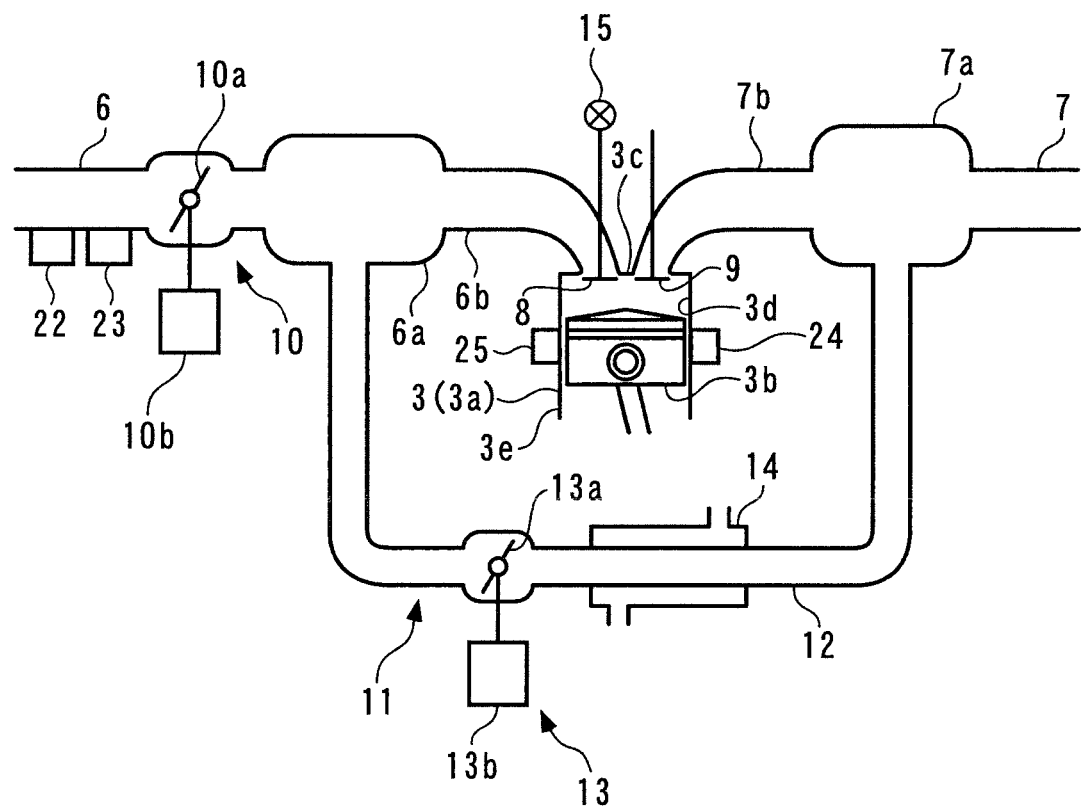
FIG. 1 is a schematic diagram of an internal combustion engine to which the present invention is applied.

The invention will now be described in detail with reference to drawings showing a preferred embodiment thereof. FIG. 1 shows an internal combustion engine (hereinafter referred to as the "engine") 3 to which the present invention is applied. The engine 3 is a gasoline engine that has e.g. four cylinders, and is installed on a vehicle, not shown. A combustion chamber 3$d$ is defined between a piston 3$b$ and a cylinder head 3$c$ for each of cylinders 3$a$ (only one of which is shown) of the engine 3.

An intake passage 6 is connected to the cylinder 3$a$ via an intake manifold 6$b$ having an intake collector 6$a$, and an exhaust passage 7 is connected to the cylinder 3$a$ via an exhaust manifold 7$b$ having an exhaust collector 7$a$. The intake manifold 6$b$ is provided with fuel injection valves 4 (see FIG. 2) and the cylinder head 3$c$ is provided with spark plugs 5 (see FIG. 2), on a cylinder-by-cylinder basis. The injection amount and injection timing of fuel injected by each fuel injection valve 4, and ignition timing IG of each spark plug 5 are controlled by control signals from an ECU 2, referred to hereinafter.

Further, an intake valve 8 and an exhaust valve 9 are provided for each cylinder 3$a$. A variable intake cam phase mechanism 15 is provided at one end of an intake cam shaft (not shown) for actuating the intake valve 8. The variable intake cam phase mechanism 15 steplessly changes a phase CAIN of the intake cam shaft relative to the crankshaft (not shown) of the engine 3 (hereinafter referred to as the "intake cam phase CAIN"), whereby the opening and closing timing of the intake valve 8 is steplessly changed (shifted) with respect to the crankshaft. Note that the intake cam phase CAIN is controlled by actuating the control shaft (not shown) of the variable intake cam phase mechanism 15 by a VTC actuator 15$a$ (see FIG. 2), and the operation of the VTC actuator 15$a$ is controlled by a control signal from the ECU 2.

A throttle valve mechanism 10 is disposed in the intake passage 6 at a location upstream of the intake collector 6$a$. The throttle valve mechanism 10 includes a butterfly-type throttle valve 10$a$ disposed in the intake passage 6, and a TH actuator 10$b$ for actuating the throttle valve 10$a$. An opening degree θTH of the throttle valve 10$a$ (hereinafter referred to as the "throttle valve opening θTH") is controlled by controlling electric current supplied to the TH actuator 10$b$ by the ECU 2, whereby an intake air amount (fresh air amount) GAIR of intake air drawn into the combustion chamber 3$d$ is adjusted.

Further, the engine 3 is provided with an EGR device 11 for recirculating part of exhaust gases discharged from the combustion chamber 3$d$ into the exhaust passage 7 to the intake passage 6, as EGR gases. The EGR device 11 comprises an EGR passage 12, an EGR valve mechanism 13 disposed in an intermediate portion of the EGR passage 12, and an EGR cooler 14. The EGR passage 12 is connected to the exhaust collector 7$a$ in the exhaust passage 7 and the intake collector 6$a$ in the intake passage 6.

The EGR valve mechanism 13 includes a poppet-type EGR valve 13$a$ disposed in the EGR passage 12, and an EGR actuator 13$b$ for actuating the EGR valve 13$a$. A lift amount LEGR of the EGR valve 13$a$ (hereinafter referred to as the "EGR valve opening LEGR") is controlled by controlling electric current supplied to the EGR actuator 13$b$ by the ECU 2, whereby an EGR amount GEGR of EGR gases recirculated to the intake passage 6 is adjusted. The EGR cooler 14 is disposed upstream of the EGR valve 13a, and cools high-temperature EGR gases using engine coolant of the engine 3.

Figure 2:
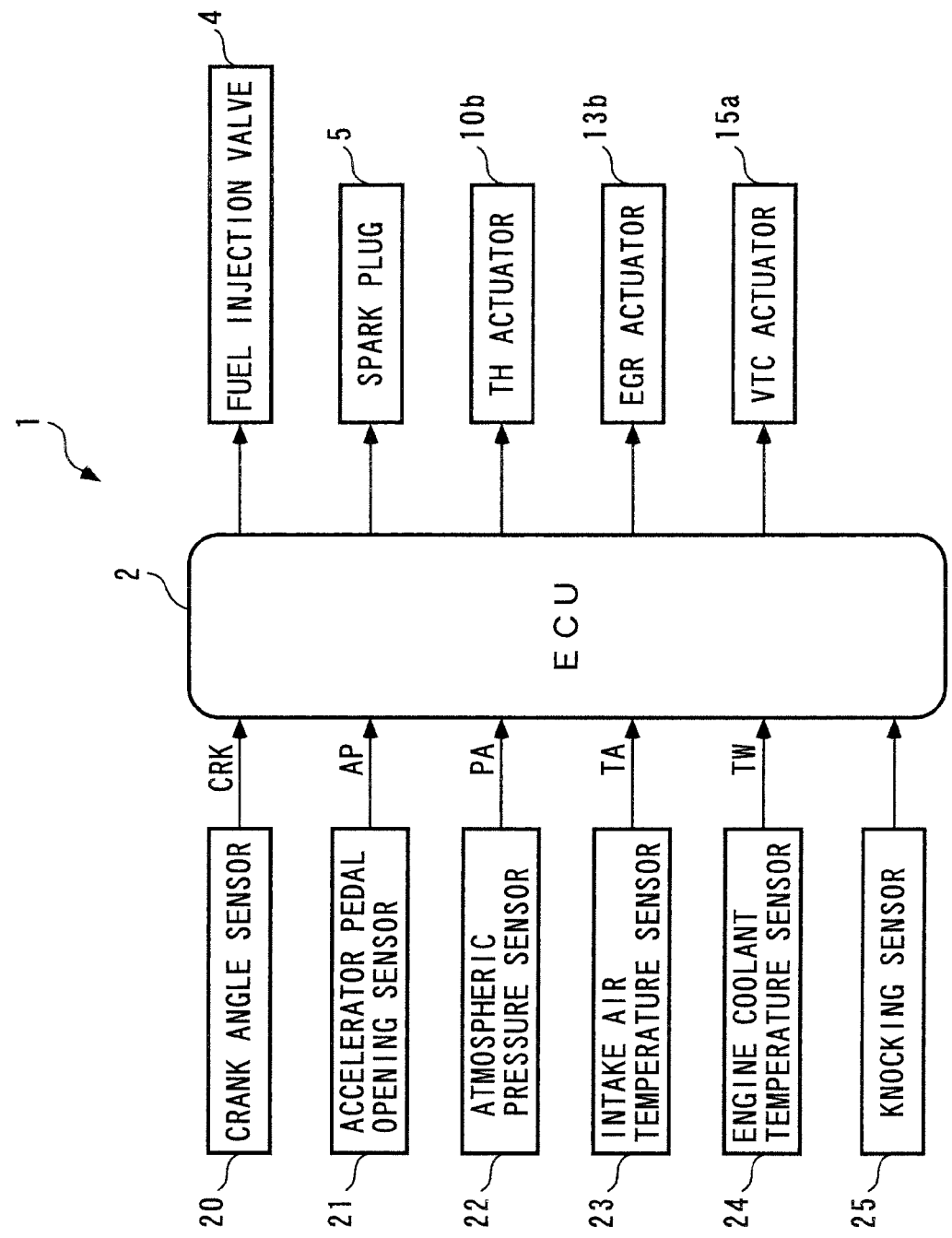
FIG. 2 is a block diagram of a control system for the engine.

The crankshaft of the engine 3 is provided with a crank angle sensor 20 (see FIG. 2). The crank angle sensor 20 delivers a CRK signal, which is a pulse signal, to the ECU 2 along with rotation of the crankshaft, whenever the crankshaft rotates through a predetermined crank angle (e.g. 30°). The ECU 2 calculates a rotational speed NE of the engine 3 (hereafter referred to as the "engine speed NE") based on the CRK signal. Also delivered to the ECU 2 is a detection signal indicative of an operation amount AP of an accelerator pedal (not shown) of the vehicle (hereinafter referred to as the "accelerator pedal opening AP") from an accelerator pedal opening sensor 21 (see FIG. 2).

An atmospheric pressure sensor 22 and an intake air temperature sensor 23 are provided in the intake passage 6 at respective locations upstream of the throttle valve 10a. The atmospheric pressure sensor 22 detects an atmospheric pressure PA and delivers a signal indicative of the detected atmospheric pressure PA to the ECU 2. The intake air temperature sensor 23 detects a temperature TA of intake air flowing through the intake passage 6 (hereinafter referred to as the "intake air temperature TA") and delivers a signal indicative of the detected intake air temperature TA to the ECU 2.

Further, a cylinder block 3e of the engine 3 is provided with an engine coolant temperature sensor 24 and a knocking sensor 25. The engine coolant temperature sensor 24 detects a temperature TW of engine coolant of the engine 3 (hereinafter referred to as the "engine coolant temperature TW"), and delivers a signal indicative of the detected engine coolant temperature TW to the ECU 2. The knocking sensor 25 detects a state of occurrence of knocking and delivers a signal indicative of the detected state of occurrence of knocking to the ECU 2.

The ECU 2 is implemented by a microcomputer comprising a CPU, a RAM, a ROM and an I/O interface (none of which are specifically shown). The ECU 2 determines the operating conditions of the engine 3 based on the detection signals from the above-described sensors 20 to 25, and executes, depending on the determined operating conditions of the engine 3, various kinds of engine control, including control of a fuel injection amount, the ignition timing IG, the intake air amount GAIR, and the EGR amount GEGR.

In the present embodiment, the ECU 2 corresponds to air-fuel ratio control means, most fuel-efficient torque-calculating means, maximum intake air amount-calculating means, provisional intake air amount-setting means, estimated torque-calculating means, provisional intake air amount-estimated torque relationship-setting means, fuel consumption ratio-calculating means, operating line-setting means, target output-setting means, target torque-setting means, target intake air amount-setting means, estimated torque characteristic curve-setting means, torque non-increase-determining means, limit torque-setting means, torque reincrease-determining means, provisional target throttle valve opening-calculating means, target throttle valve opening-setting means, and estimated retard amount-calculating means.

Figure 3:
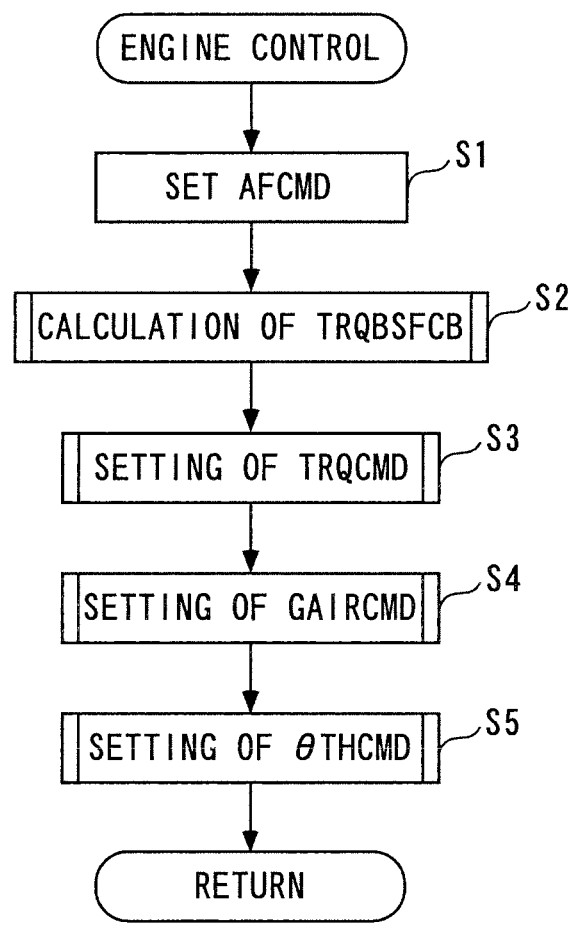
FIG. 3 is a flowchart of a main routine of a control process for controlling the engine.

FIG. 3 shows a main routine of a control process for controlling the engine 3, executed by the ECU 2. This process is repeatedly executed whenever a predetermined time period elapses.

First, in a step 1 (shown as S1 in abbreviated form in FIG. 3; the following steps are also shown in abbreviated form), a target air-fuel ratio AFCMD, which is a target value of the air-fuel ratio of a mixture burned in the combustion chamber 3d, is set. In this case, under normal operating conditions of the engine 3, the target air-fuel ratio AFCMD is set to a stoichiometric air-fuel ratio to perform stoichiometric combustion, while during acceleration operation of the engine 3, the target air-fuel ratio AFCMD is controlled to a richer value than the stoichiometric air-fuel ratio.

Next, a process for calculating the most fuel-efficient torque TRQBSFCB is executed (step 2). This most fuel-efficient torque TRQBSFCB corresponds to torque of the engine 3, which minimizes a fuel consumption ratio BSFC (i.e. which maximizes a combustion efficiency) assuming that the engine 3 is operated at a reference engine speed NEREF, referred to hereinafter. In the calculation process, a plurality of most fuel-efficient torques $TRQBSFCB_j$ are calculated in association with a plurality of reference engine speeds $NEREF_j$, respectively, and an operating line connecting a plurality of operating points, which are respective combinations of the reference engine speeds $NEREF_j$ and the most fuel-efficient torques $TRQBSFCB_j$, is set.

Next, a process for setting a target torque TRQCMD of the engine 3 is executed (step 3). This setting process sets the target torque TRQCMD and a target engine speed NECMD that satisfy target output PWRCMD of the engine 3, based on the operating line set in the above-described step 2.

Then, a process for setting a target intake air amount GAIRCMD is executed (step 4). This setting process sets the target intake air amount GAIRCMD, which is a target value of the intake air amount GAIR, and a target EGR amount GEGRCMD, which is a target value of the EGR amount GEGR, according to the target torque TRQCMD set in the above-described step 3.

Next, a process for setting a target throttle valve opening θTHCMD is executed (step 5), followed by terminating the FIG. 3 process. This setting process sets the target throttle valve opening θTHCMD, which is a target value of the throttle valve opening θTH, according to the target intake air amount GAIRCMD set in the above-described step 4, etc.

Figure 4:
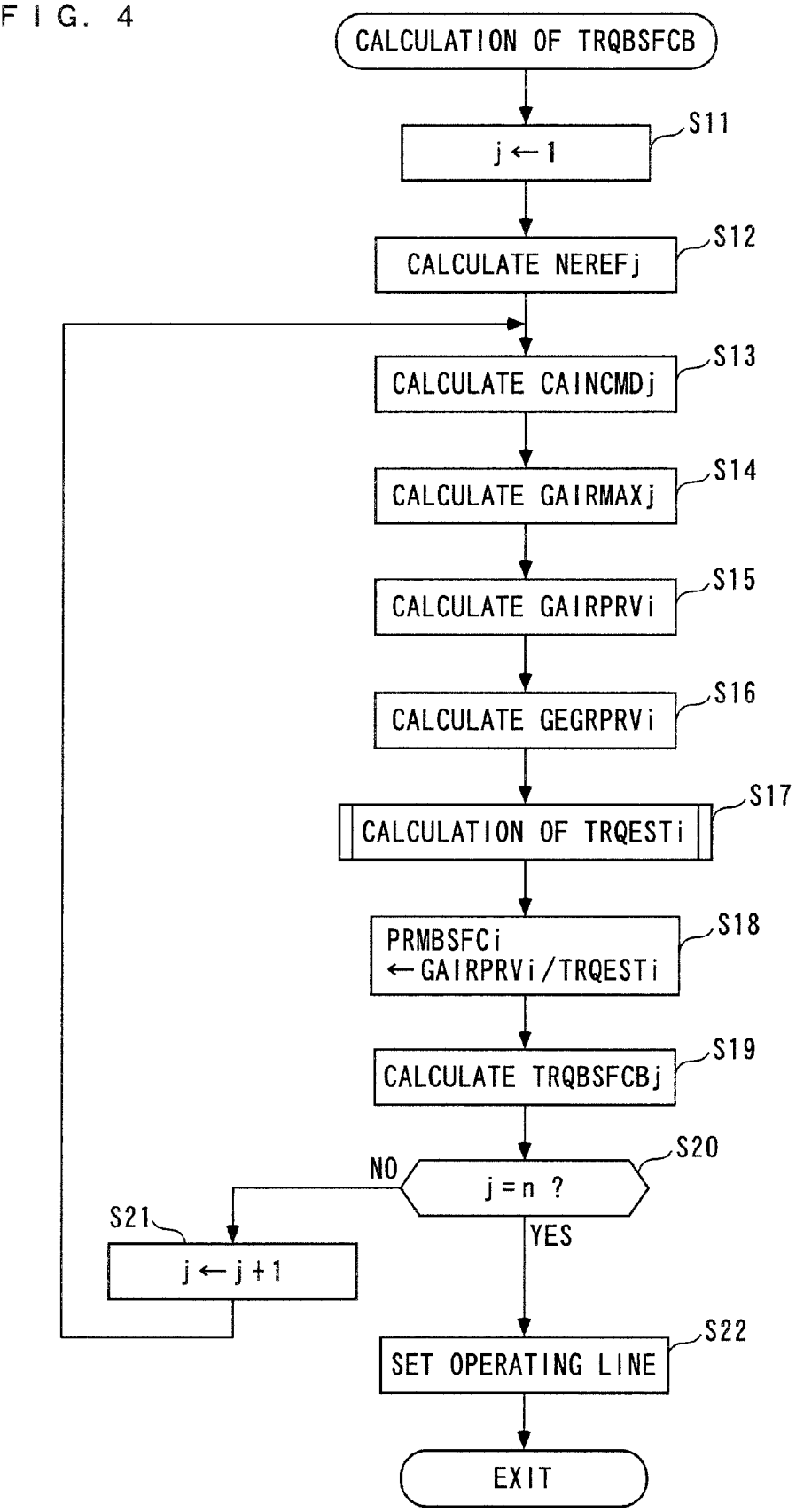
FIG. 4 is a flowchart of a process, as a subroutine, for calculating the most fuel-efficient torque.

FIG. 4 shows a process, as a subroutine, for calculating the most fuel-efficient torque TRQBSFCB, executed in the step 2 shown in FIG. 3. In the present process, first, in a step 11, an index number j (j=1 to n) indexing a value of the reference engine speed NEREF is set to 1. Then, a reference engine speed $NEREF_j$ of the engine 3 is calculated by the following equation (1) (step 12):

$$NEREF_j = (NEMAX/n) \times j \qquad (1)$$

In the equation, NEMAX represents a maximum engine speed at which the engine 3 can be operated (e.g. 6000 rpm), and the index number j is incremented up to a maximum value n, referred to hereinafter. Therefore, the reference engine speeds $NEREF_j$ are formed by n engine speeds NE corresponding respectively to 1 to n equal divisional speeds (one-nth speeds) of the maximum engine speed NEMAX.

Next, a target intake cam phase $CAINCMD_j$ is calculated by searching a predetermined CAINCMD map (not shown) according to a detected accelerator pedal opening AP and the calculated reference engine speed $NEREF_j$ (step 13). In the CAINCMD map, as the accelerator pedal opening AP is larger, the target intake cam phase CAINCMD is set to be more advanced.

Then, a maximum intake air amount $GAIRMAX_j$ is calculated by searching a predetermined GAIRMAX map (not shown) according to the calculated target intake cam phase $CAINCMD_j$ and the reference engine speed $NEREF_j$ (step 14). The maximum intake air amount GAIRMAX corresponds to a maximum intake air amount that can be drawn into the combustion chamber 3d when the engine 3 is operated at the reference engine speed NEREFj.

Next, a plurality of provisional intake air amounts GAIRPRVi (i=1 to m) are calculated using the calculated maximum intake air amount GAIRMAXj by the following equation (2) (step 15):

$$GAIRPRVi = (GAIRMAXj/m) \times i \quad (2)$$

As is apparent from the above equation (2), the provisional intake air amounts GAIRPRVi are formed by m intake air amounts corresponding respectively to 1 to m equal divisional amounts (one-mth amounts) of the maximum intake air amount GAIRMAXj. The calculated provisional intake air amounts GAIRPRVi are stored in a predetermined storage area of the RAM of the ECU 2.

Next, each of a plurality of provisional EGR amounts GEGRPRVi is calculated by searching a predetermined GEGRPRV map (not shown) according to an associated one of the provisional intake air amounts GAIRPRVi, the target intake cam phase CAINCMDj, and the reference engine speed NEREFj (step 16). In this GEGRPRV map, an EGR amount which makes it possible to obtain optimum fuel economy with respect to the provisional intake air amount GAIRPRV, the target intake cam phase CAINCMD, and the reference engine speed NEREFj, is set as a provisional EGR amount GEGRPRV.

Note that when the intake pressure is limited so as to ensure the differential pressure between the upstream side and the downstream side of the EGR valve 13a e.g. for the reason that the vehicle is in highland conditions, the provisional EGR amounts GEGRPRVi are corrected such that they are reduced, as deemed appropriate. The calculated provisional EGR amounts GEGRPRVi are stored in the predetermined storage area of the RAM in a manner associated with the provisional intake air amounts GAIRPRVi, respectively.

Then, a plurality of estimated torques TRQESTi associated with the provisional intake air amounts GAIRPRVi, respectively, are calculated (step 17). The estimated torques TRQESTi are torques which are estimated to be output from the engine 3 assuming that the respective provisional intake air amounts GAIRPRVi of intake air are drawn into the combustion chamber 3d under the operating conditions of the engine 3 set before this time. The estimated torques TRQESTi are each calculated on a provisional intake air amount basis.

Figure 5:
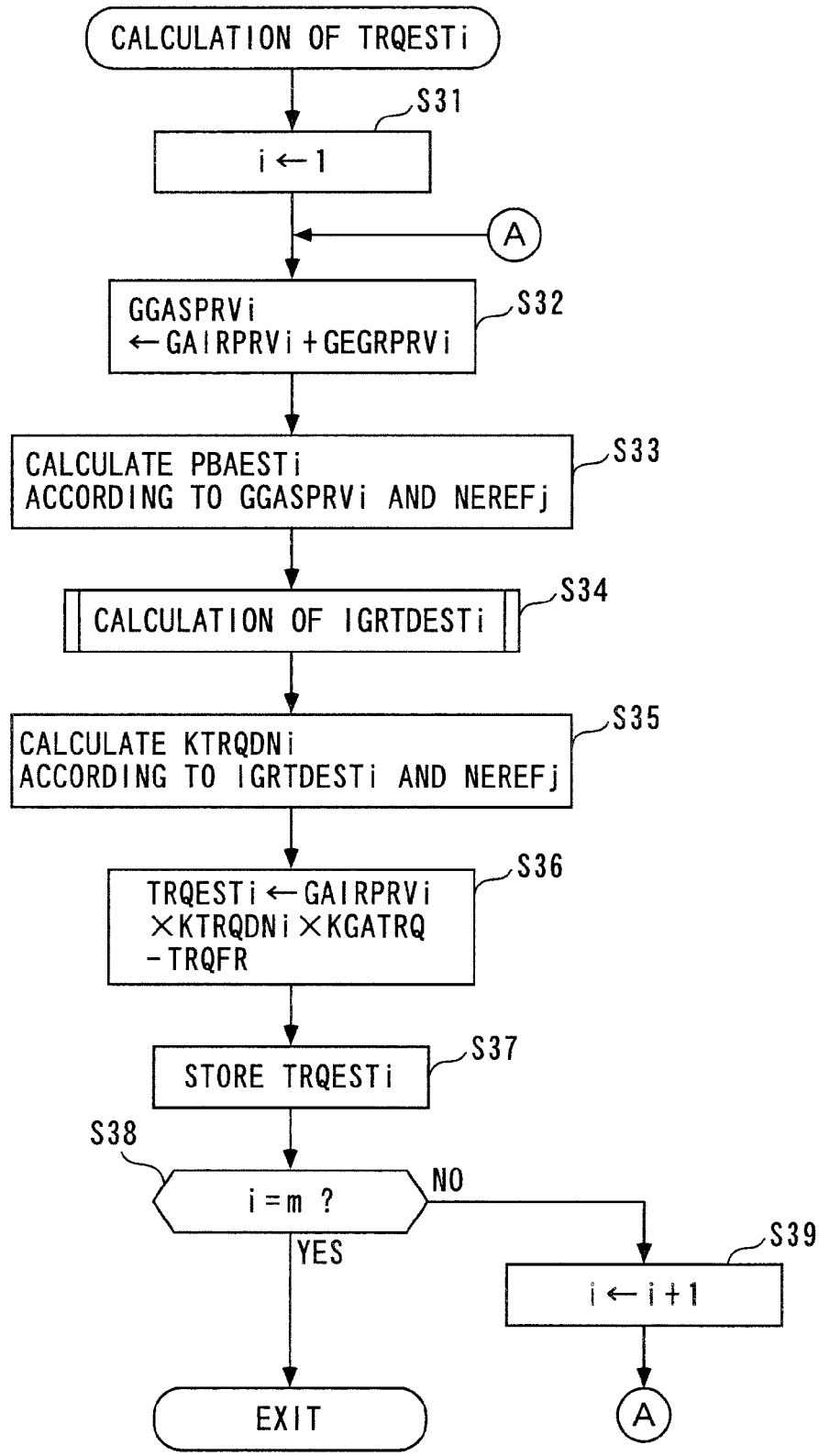
FIG. 5 is a flowchart of a process, as a subroutine, for calculating estimated torques.

FIG. 5 shows the process, as a subroutine, for calculating the estimated torques TRQESTi. In the present process, first, in a step 31, an index number i indexing a value of the provisional intake air amount GAIRPRVi is set to 1. Then, the sum of the provisional intake air amount GAIRPRVi and the provisional EGR amount GEGRPRVi, calculated in the steps 15 and 16 in FIG. 4, respectively, is calculated as a provisional total gas amount GGASPRVi (step 32).

Figure 7:
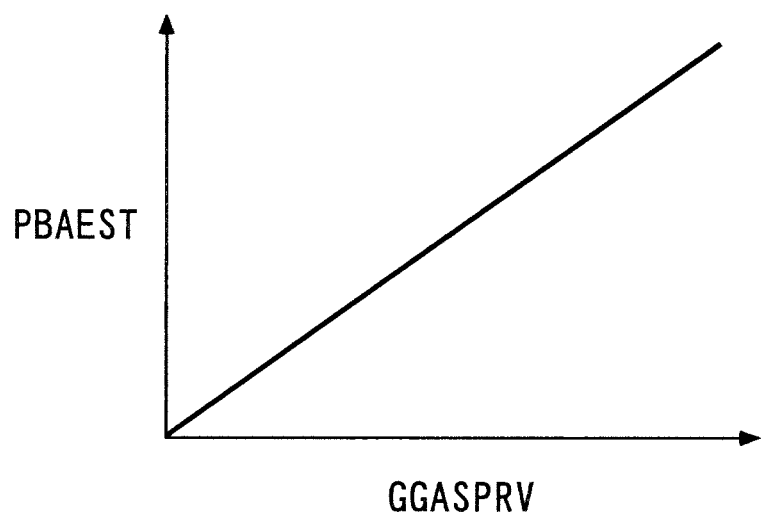
FIG. 7 is a map for use in calculating an estimated intake pressure used in the calculation process in FIG. 5.

Then, an estimated intake pressure PBAESTi is calculated by searching a PBAEST map shown in FIG. 7 according to the calculated provisional total gas amount GGASPRVi and the reference engine speed NEREFj (step 33). The PBAEST map shown in FIG. 7 shows the relationship between the provisional total gas amount GGASPRV and the estimated intake pressure PBAEST, at a single reference engine speed NEREF, and the estimated intake pressure PBAEST is set such that it is proportional to the provisional total gas amount GGASPRV.

Figure 6:
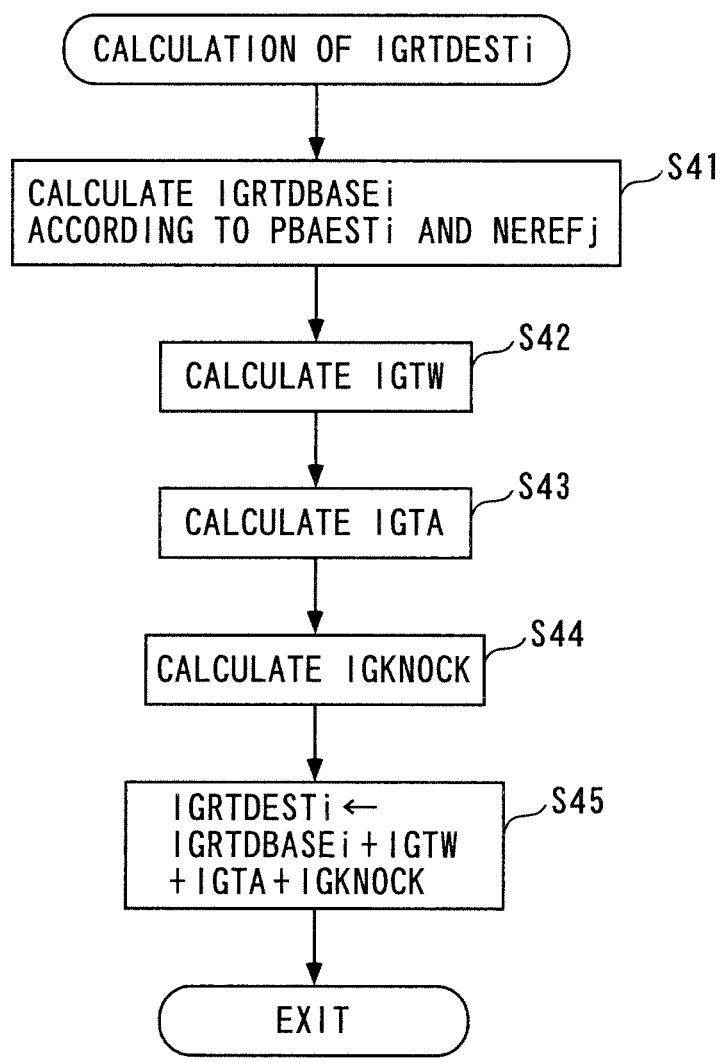
FIG. 6 is a flowchart of a process, as a subroutine, for calculating an estimated retard amount.

Next, an estimated retard amount IGRTDESTi is calculated based on the MBT (Minimum Spark Advance for Best Torque) of the ignition timing IG (step 34). FIG. 6 shows the process, as a subroutine, for calculating the estimated retard amount IGRTDESTi. In the present process, first, in a step 41, a basic value IGRTDBASEi of the estimated retard amount is calculated by searching a predetermined IGRTDBASE map (not shown) according to the estimated intake pressure PBAESTi calculated in the above-described step 33 and the reference engine speed NEREFj. As the estimated intake pressure PBAEST is higher, knocking is more liable to occur, and hence in this IGRTDBASE map, the basic value IGRTDBASE is set to a larger value, i.e. set to be more retarded.

Then, a coolant temperature-dependent correction amount IGTW of the ignition timing IG is calculated according to a detected engine coolant temperature TW (step 42), and an intake air temperature-dependent correction amount IGTA of the ignition timing IG is calculated according to a detected intake air temperature TA (step 43). Further, a knock-dependent correction amount IGKNOCK of the ignition timing IG is calculated according to a state of occurrence of knocking detected by the knocking sensor 25 (step 44). Then, an estimated retard amount IGRTDESTi of the ignition timing IG is calculated by adding the above-described three correction amounts IGTW, IGTA and IGKNOCK to the basic value IGRTDBASEi of the estimated retard amount calculated in the step 41 (step 45), followed by terminating the present process.

Figure 8:
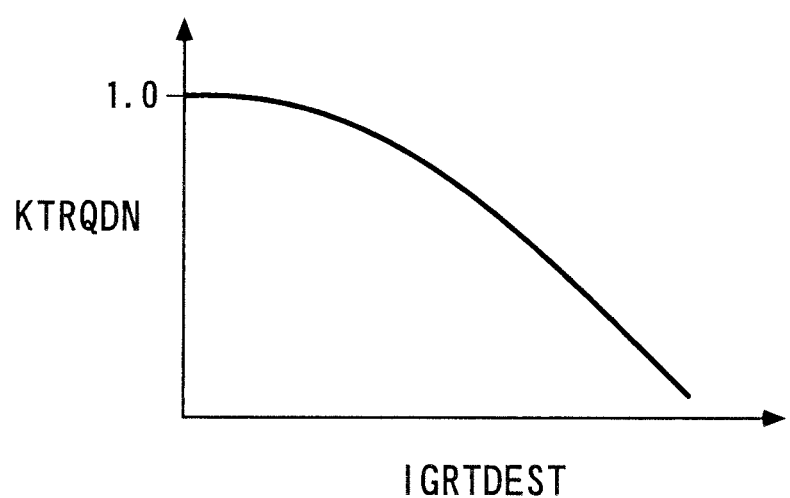
FIG. 8 is a map for use in calculating an estimated torque-down ratio used in the calculation process in FIG. 5.

Referring again to FIG. 5, in a step 35 following the step 34, an estimated torque-down ratio KTRQDNi with reference to torque during MBT combustion is calculated by searching a KTRQDN map shown in FIG. 8 according to the calculated estimated retard amount IGRTDESTi and the reference engine speed NEREFj. The KTRQDN map shown in FIG. 8 shows the relationship between the estimated retard amount IGRTDEST and the estimated torque-down ratio KTRQDN, at a single reference engine speed NEREFj. As the estimated retard amount IGRTDEST is larger, the combustion efficiency of the engine 3 is reduced to lower an output torque, and hence the estimated torque-down ratio KTRQDN is set to a smaller value.

Then, the estimated torque TRQESTi is calculated using the provisional intake air amount GAIRPRVi, the above-described estimated torque-down ratio KTRQDNi, and so forth, by the following equation (3) (step 36):

$$TRQESTi = GAIRPRVi \times KTRQDNi \times KGATRQ - TRQFR \quad (3)$$

In the equation, KGATRQ on the right side represents a predetermined conversion coefficient for converting the intake air amount GAIR to the output torque of the engine 3 during the stoichiometric and MBT combustion, and TRQFR on the right side represents a predetermined friction as a torque loss of the engine 3.

Next, the calculated estimated torque TRQESTi is stored in the predetermined storage area of the RAM in a manner associated with the provisional intake air amount GAIRPRVi (step 37). Further, it is determined whether or not the index number i at this time is equal to the number m of samples of the provisional intake air amount GAIRPRVi (step 38). If the answer to this question is negative (NO), the index number i is incremented in a step 39, and then the process returns to the above-described step 32, to repeatedly execute the steps 32 to 37 for calculation of the estimated torque TRQESTi. When the calculation of the estimated torques TRQESTi in association with all the provisional intake air amounts GAIRPRVi is completed, the answer to the question of the step 38 becomes affirmative (YES), and accordingly, the present process is terminated.

Figure 9:
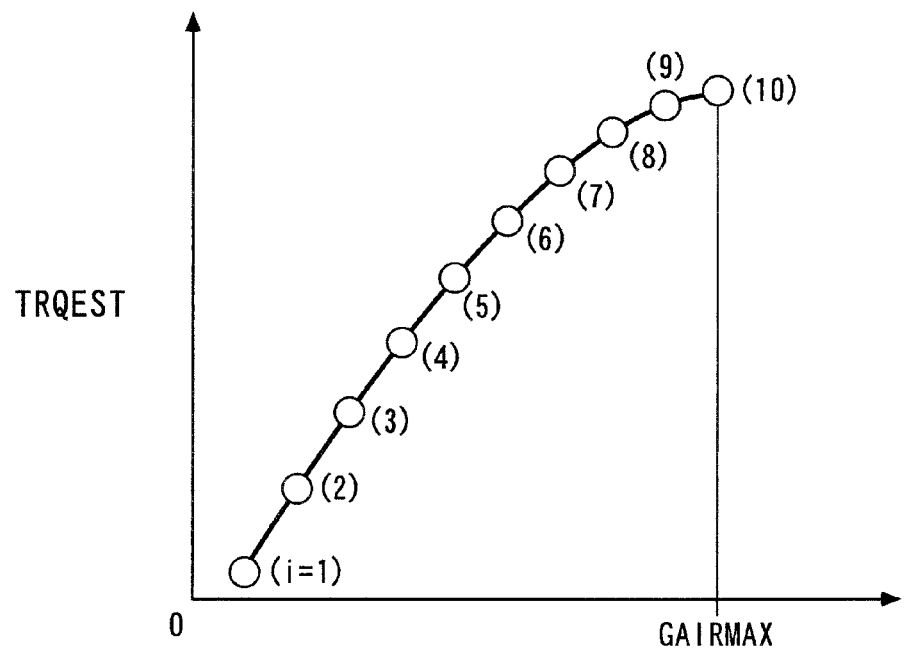
FIG. 9 is a view of an example of a provisional intake air amount-estimated torque relationship.

By performing the above-described calculation process, the respective estimated torques TRQESTi which reflect the estimated retard amounts IGRTDESTi estimated according to the operating conditions of the engine 3 including the reference engine speed NEREFj are calculated with respect to all the provisional intake air amounts GAIRPRVi, and are stored in a manner associated with the provisional intake air amounts GAIRPRVi. This sets the relationship between the provisional intake air amounts GAIRPRVi and the estimated torques TRQESTi (hereinafter referred to as the "provisional intake air amount-estimated torque relationship"), defined by a combination of m provisional intake air amounts GAIRPRV and m estimated torques TRQEST, as illustrated in FIG. 9.

Referring again to FIG. 4, in a step 18 following the above-described step 17, a fuel consumption ratio parameter PRMBSFCi is calculated based on the provisional intake air amount-estimated torque relationship, set as described above, by the following equation (4):

$$PRMBSFCi = GAIRPRVi/(TRQESTi \times NEREFj) \quad (4)$$

Thus, the fuel consumption ratio parameter PRMBSFCi is obtained by dividing each of the provisional intake air amounts GAIRPRVi by the product of respective associated ones of the estimated torques TRQESTi and the reference engine speeds NEREFj, and therefore represents an intake air amount required for generating a unit output. Further, as described above, the target air-fuel ratio AFCMD of the mixture is set to the stoichiometric air-fuel ratio under the normal operating conditions of the engine 3. Therefore, insofar as the target air-fuel ratio AFCMD is controlled to a predetermined value as described above, the fuel consumption ratio parameter PRMBSFC is proportional to a fuel consumption amount required for generating the unit output, i.e. to the fuel consumption ratio BSFC.

Figure 10:
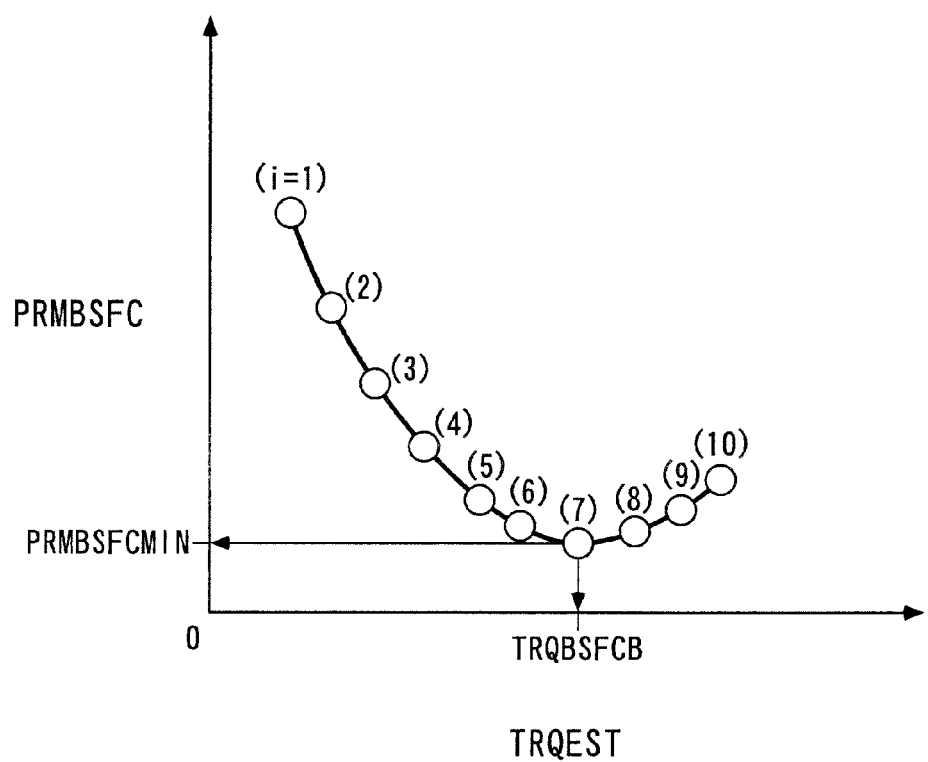
FIG. 10 is a view useful in explaining a method of calculating the most fuel-efficient torque.

Next, the most fuel-efficient torque TRQBSFCBj at the reference engine speed NEREFj at this time is calculated based on the calculated fuel consumption ratio parameter PRMBSFCi and the estimated torque TRQESTi (step 19). Specifically, as shown in FIG. 10, an estimated torque TRQEST associated with a minimum fuel consumption ratio PRMBSFCMIN of m fuel consumption ratio parameters PRMBSFCi is calculated as the most fuel-efficient torque TRQBSFCBj. As described above, since the fuel consumption ratio parameter PRMBSFC is proportional to the fuel consumption ratio BSFC, this method makes it possible to properly calculate the most fuel-efficient torque TRQBSFCBj.

Next, it is determined whether or not an index number j indexing a value of the reference engine speed NEREF at this time is equal to the number n of samples of the reference engine speed NEREF (step 20). If the answer to this question is negative (NO), the index number j is incremented in a step 21, and then the process returns to the above-described step 13 to repeatedly execute the steps 13 to 20 for setting the provisional intake air amount-estimated torque relationship for each reference engine speeds NEREF.

Then, when the answer to the question of the step 20 becomes affirmative (YES), i.e. when the setting of the provisional intake air amount-estimated torque relationship for all the reference engine speeds NEREFj has been completed, an operating line is set in the step 22, followed by terminating the present process.

Figure 11:
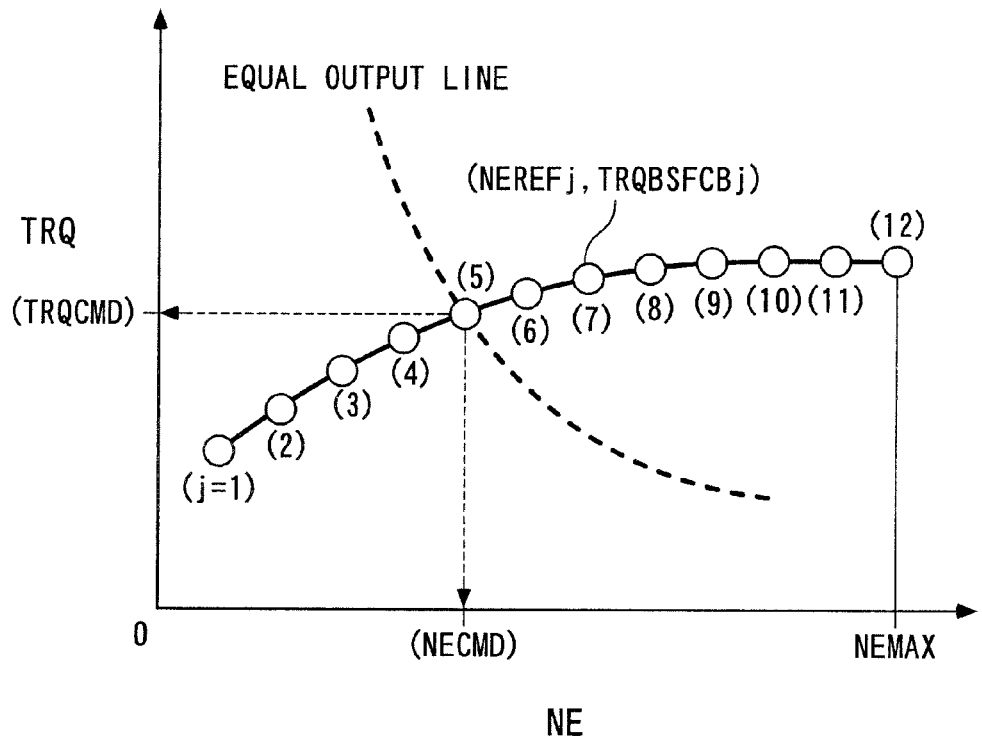
FIG. 11 is a view of an operating line set on an engine speed-torque coordinate plane.

As shown in FIG. 11, the operating line is obtained by plotting a plurality of operating points (NEREFj, TRQBSFCBj), which are respective combinations of a plurality of reference engine speeds NEREFj and a plurality of most fuel-efficient torque TRQBSFCBj calculated in a manner associated with the reference engine speeds NEREFj, on a coordinate plane defined by coordinate axes representing the engine speed NE and the torque TRQ of the engine 3, and connecting the operating points. As described hereinafter, the target torque TRQCMD is calculated based on the operating line.

Figure 12:
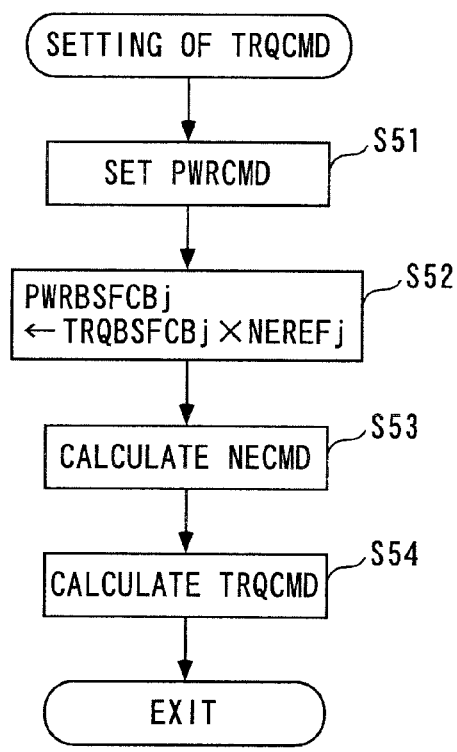
FIG. 12 is a flowchart of a process, as a subroutine, for setting a target torque.

FIG. 12 shows a process, as a subroutine, for setting the target torque TRQCMD, which is executed in the step 3 in FIG. 3. In the present process, first, in a step 51, the target output PWRCMD of the engine 3 is calculated by searching a predetermined PWRCMD map (not shown) according to the detected accelerator pedal opening AP and the engine speed NE. In this PWRCMD map, the target output PWRCMD is set such that it is substantially proportional to the accelerator pedal opening AP.

Next, a most fuel-efficient output PWRBSFCBj of the engine 3 is calculated based on the above-described operating line by the following equation (5) (step 52):

$$PWRBSFCBj = TRQBSFCBj \times NEREFj \quad (5)$$

The most fuel-efficient output PWRBSFCBj is obtained by converting the most fuel-efficient torque TRQBSFCB at each reference engine speed NEREF to the output of the engine 3. This makes it possible to obtain combinations (NEREFj, PWRBSFCBj) of a plurality of reference engine speeds NEREFj and a plurality of most fuel-efficient outputs PWRBSFCBj, as shown in FIG. 13.

Then, the target engine speed NECMD is calculated based on the calculated most fuel-efficient outputs PWRBSFCBj (step 53). Specifically, as shown in FIG. 13, a most fuel-efficient output PWRBSFCB matching the target output PWRCMD set in the step 51 is searched for, and a reference engine speed NEREF associated the most fuel-efficient output PWRBSFCB is set as the target engine speed NECMD.

Then, the target torque TRQCMD is calculated by dividing the target output PWRCMD by the target engine speed NECMD (step 54), followed by terminating the present process.

As described hereinabove, according to the present embodiment, the air-fuel ratio of the mixture is controlled to a predetermined target air-fuel ratio AFCMD, and the relationship between a plurality of provisional intake air amounts GAIRPRVi and a plurality of estimated torques TRQESTi, obtained when the engine 3 is operated at the reference engine speed NEREF, is set based on the operating conditions of the engine 3 (step 17 in FIG. 4, FIG. 9). Further, based on the provisional intake air amount-estimated torque relationship, a plurality of fuel consumption ratio parameters PRMBSFCi associated with the plurality of estimated torques TRQESTi are calculated, and an estimated torque TRQEST associated with a minimum fuel consumption ratio PRMBSFCMIN of the fuel consumption ratio parameters PRMBSFCi is calculated as the most fuel-efficient torque TRQBSFCB at the reference engine speed NEREF (steps 18 and 19 in FIG. 4, FIG. 10).

Further, the above-described calculation of the most fuel-efficient torque TRQBSFCBj is performed at each of the reference engine speeds NEREFj, and an operating line connecting a plurality of operating points, which are respective combinations of the reference engine speeds NEREFj and the most fuel-efficient torques TRQBSFCBj, is set on the coordinate plane defined by the coordinate axes representing the engine speed NE and the torque TRQ (step 22 in FIG. 4, FIG. 11). This makes it possible to properly calculate the most fuel-efficient torques TRQBSFCBj at each reference engine speed NEREFj while directly reflecting operating conditions of the engine 3 at the time on the calculation of the most fuel-efficient torques TRQBSFCBj, without causing delayed learning as in the conventional control system, and properly set an operating line based on the most fuel-efficient torques TRQBSFCBj.

As a consequence, by controlling the engine 3 based on appropriate most fuel-efficient torque, it is possible to improve fuel economy. Further, differently from the conventional control system, there is no need to set or update in advance operating lines indicative of most fuel-efficient torques, which makes it possible to reduce the costs of the control system.

Further, the most fuel-efficient torque TRQBSFCBj at each reference engine speed NEREFj is converted to the output of the engine 3 based on the set operating line (step 52 in FIG. 12), and the reference engine speed NEREF and the most fuel-efficient torque TRQBSFCB, which are associated with the most fuel-efficient output PWRBSFCB that matches the set target output PWRCMD, are set as the target engine speed NECMD and the target torque TRQCMD (steps 53 and 54 in FIG. 12, FIG. 13). This makes it possible to easily select the target torque TRQCMD and the target engine speed NECMD satisfying the target output PWRCMD of the engine 3 from the operating line, and properly set the target torque TRQCMD and the target engine speed NECMD.

Next, the process for setting the target intake air amount GAIRCMD executed in the step 4 in FIG. 3 will be described with reference to FIGS. 14 to 19. This setting process sets the target intake air amount GAIRCMD according to the target torque TRQCMD set in the process in FIG. 3 using the provisional intake air amount-estimated torque relationship already set in the step 17 in FIG. 4. In this case, as the provisional intake air amount-estimated torque relationship, there is used one associated with the reference engine speed NEREF employed as the target engine speed NECMD.

Further, the characteristics of the provisional intake air amount-estimated torque relationship vary with estimated operating conditions of the engine 3, typified by the estimated retard amount IGRTDEST of the ignition timing IG. FIGS. 14 to 17 show estimated torque characteristic curves obtained by plotting the provisional intake air amount-estimated torque relationship, respectively, which show four characteristic patterns different from each other.

Figure 14:
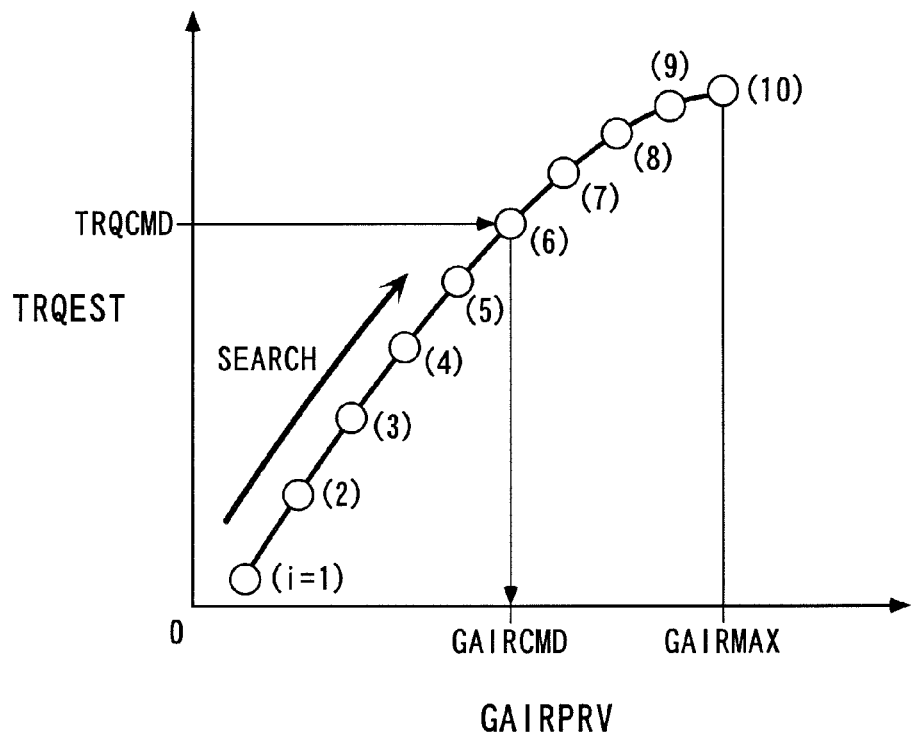
FIG. 14 is a view showing an example of an estimated torque characteristic curve having a characteristic of a first pattern.

A first pattern shown in FIG. 14 is the same as illustrated in FIG. 9, and is a normal pattern (monotonically increasing pattern) in which the estimated torque TRQEST monotonically increases as the provisional intake air amount GAIRPRV increases.

Figure 15:
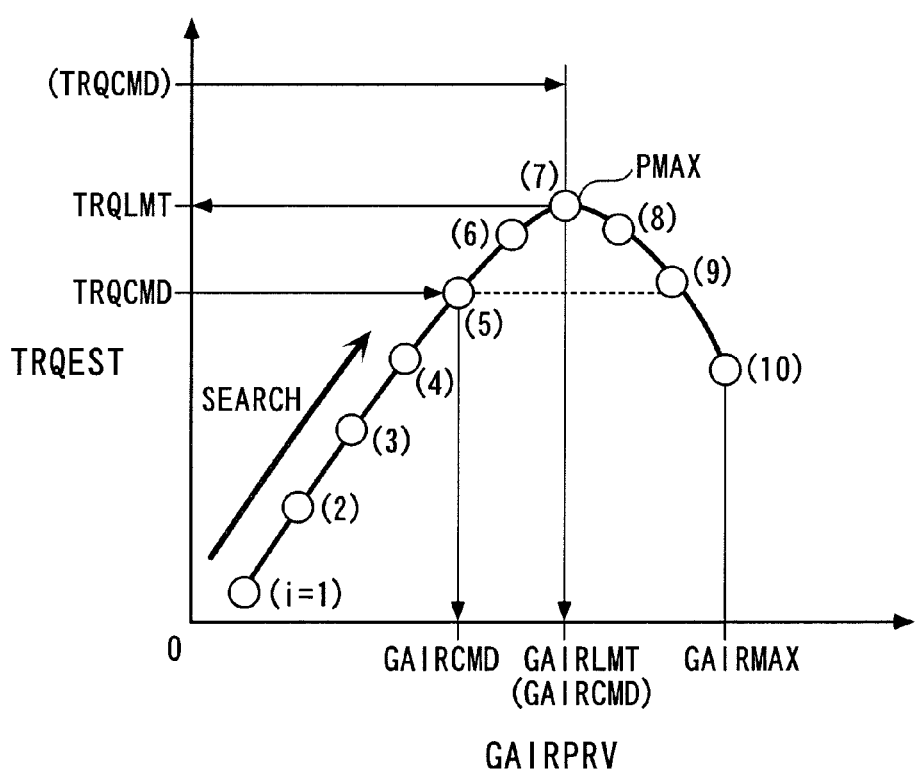
FIG. 15 is a view showing an example of an estimated torque characteristic curve having a characteristic of a second pattern.

A second pattern shown in FIG. 15 is a pattern (quadratic curve pattern) in which as the provisional intake air amount GAIRPRV increases, the estimated torque TRQEST increases to a maximum value, and after passing this maximum point PMAX, the estimated torque TRQEST decreases (drops) e.g. due to an increase in the estimated retard amount IGRTDEST for control of knocking.

Figure 16:
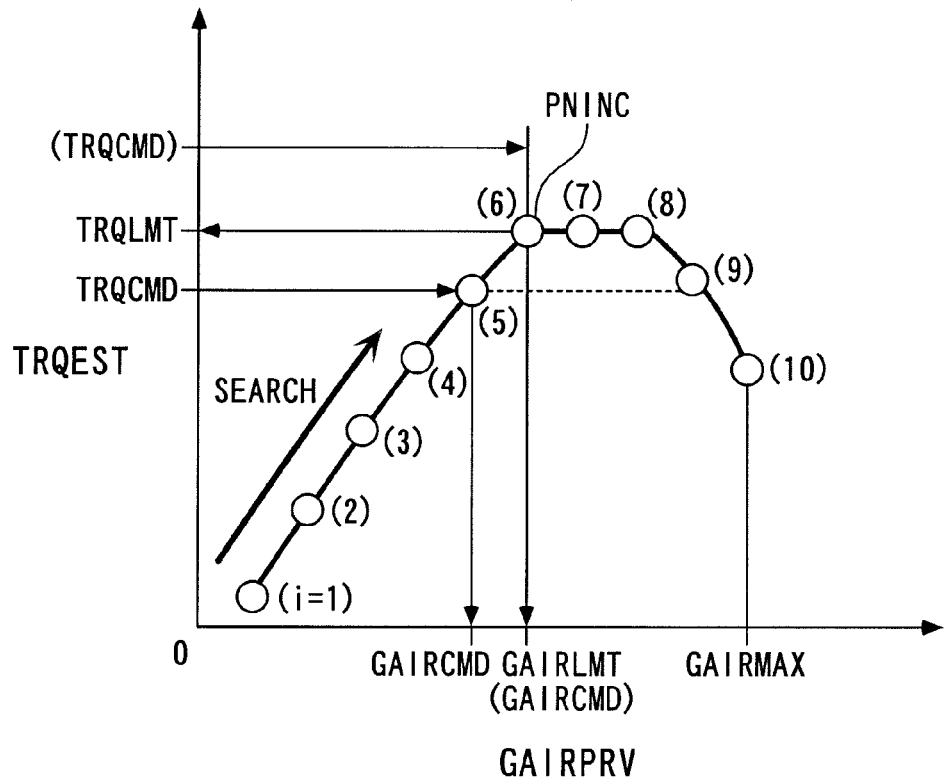
FIG. 16 is a view showing an example of an estimated torque characteristic curve having a characteristic of a third pattern.

A third pattern shown in FIG. 16 is a pattern which can be regarded as a variation of the second pattern and in which a specific maximum point of the estimated torque TRQEST does not appear as in the second pattern, but as the provisional intake air amount GAIRPRV increases, the estimated torque TRQEST increases up to a non-increasing point PNINC, and thereafter, even when the provisional intake air amount GAIRPRV increases, the estimated torque TRQEST is substantially constant instead of increasing, and then decreases.

Figure 17:
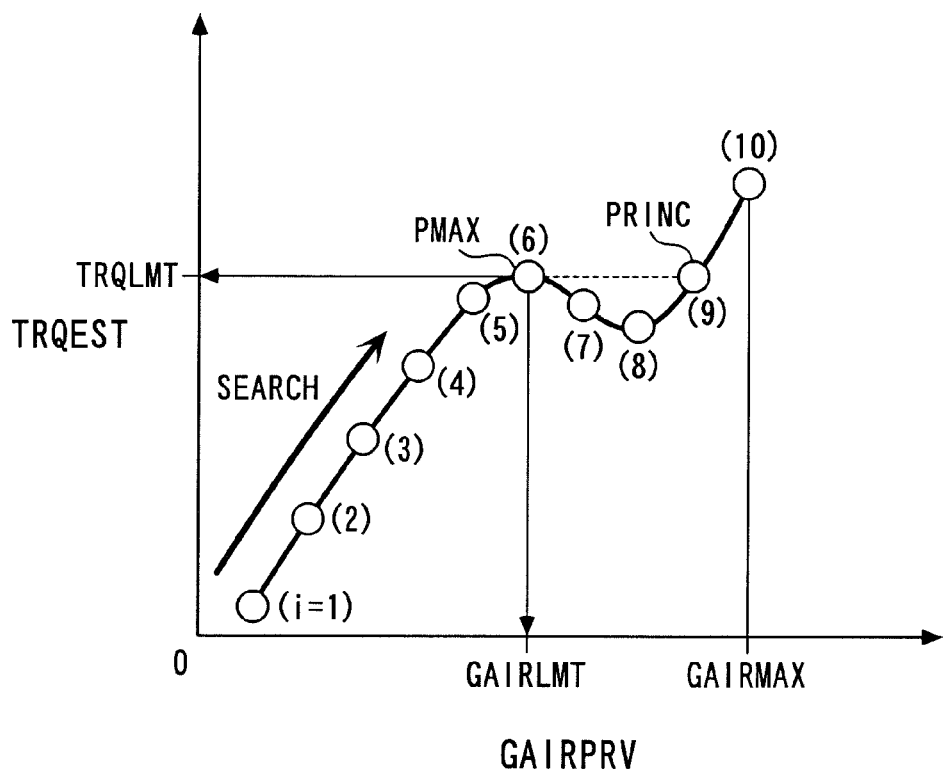
FIG. 17 is a view showing an example of an estimated torque characteristic curve having a characteristic of a fourth pattern.

Further, a fourth pattern shown in FIG. 17 is a pattern (cubic curve pattern) in which the estimated torque TRQEST decreases after passing the maximum point PMAX, similarly to the above-described second pattern, and then the estimated torque TRQEST starts to increase again due to limitation of the estimated retard amount IGRTDEST for maintaining excellent combustion and like other causes, beyond a re-increasing point PRINC equal to the maximum point PMAX.

Figure 18:
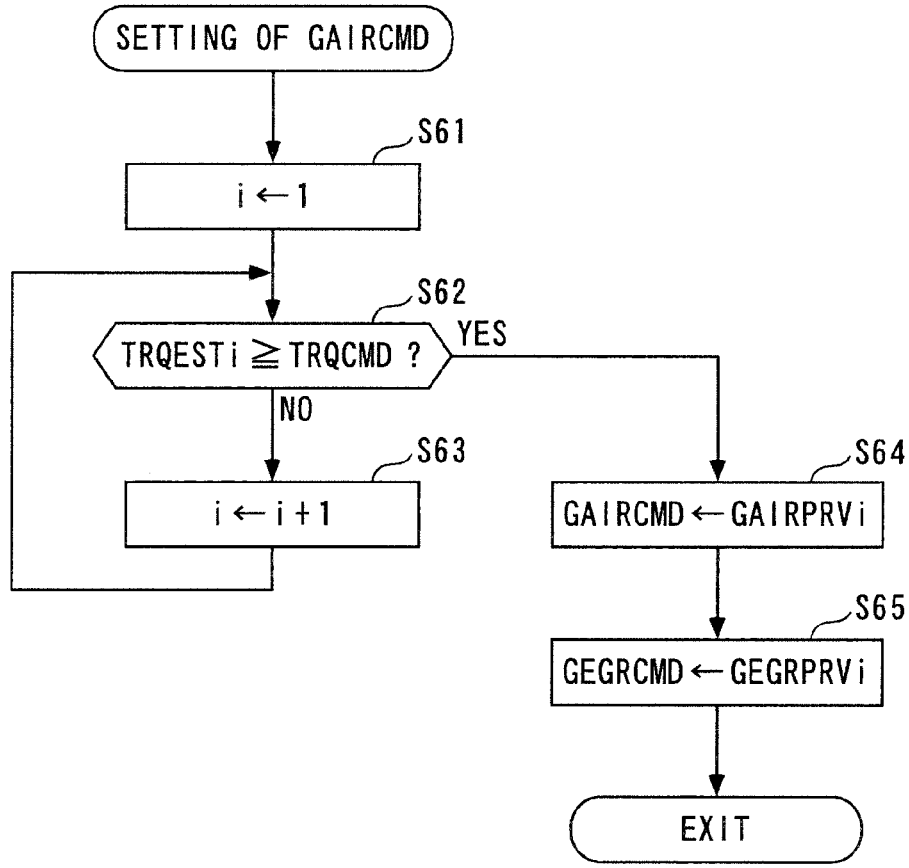
FIG. 18 is a flowchart of a process for setting a target intake air amount, according to a first embodiment.

A setting process shown in FIG. 18, according to a first embodiment, sets the target intake air amount GAIRCMD without determining the above-described characteristic pattern of the estimated torque characteristic curve.

In the present process, first, the index number i of the provisional intake air amount GAIRPRV is set to 1 (step 61), and it is determined whether or not the estimated torque TRQESTi associated with the index number i, i.e. in this case, an estimated torque TRQEST1 is not smaller than the target torque TRQCMD (step 62). If the answer to this question is negative (NO), the index number i is incremented (step 63), and the determination in the above-described step 62 is executed again. As described above, the determination of the estimated torque TRQESTi in the step 62 is executed in an increasing order of the index numbers i, that is, in an increasing order of the provisional intake air amounts GAIRPRVi.

On the other hand, if the answer to the question of the step 62 is affirmative (YES), i.e. if the relationship of the estimated torque TRQESTi≥ the target torque TRQCMD holds, the provisional intake air amount GAIRPRVi associated with the estimated torque TRQESTi at this time is selected and set as the target intake air amount GAIRCMD (step 64). Further, the provisional EGR amount GEGRPRVi stored in a manner associated with the above provisional intake air amount GAIRPRVi is set as the target EGR amount GEGRCMD (step 65), followed by terminating the present process.

Based on the respective target intake air amount GAIRCMD and target EGR amount GEGRCMD calculated as above, the target values of the throttle valve opening θTH and the EGR valve opening LEGR are set, and further the throttle valve 10a and the EGR valve 13a are actuated based on the target values, whereby the intake air amount GAIR is controlled such that it becomes equal to the target intake air amount GAIRCMD, and the EGR amount GEGR is controlled such that it becomes equal to the target EGR amount GEGRCMD.

As described above, according to the present embodiment, based on the preset provisional intake air amount-estimated torque relationship which is associated with the reference engine speed NEREF employed as the target engine speed NECMD, the provisional intake air amounts GAIRPRVi are sequentially searched in an increasing order thereof for a provisional intake air amount GAIRPRVi which makes the estimated torque TRQESTi equal to or larger than the target torque TRQCMD, and the provisional intake air amount GAIRPRVi found by the search is set as the target intake air amount GAIRCMD (steps 61 to 64).

Therefore, when there are a plurality of solutions to the intake air amount for attaining one target torque TRQCMD, for example, even when the characteristic patterns of the estimated torque characteristic curves are the second to fourth patterns shown in FIGS. 15 to 17, it is possible to positively select a minimum provisional intake air amount GAIRPRV, which makes the estimated torque TRQEST equal to or close to the target torque TRQCMD, without causing hunting of the provisional intake air amount GAIRPRV. Then, the selected minimum provisional intake air amount GAIRPRV is set as the target intake air amount GAIRCMD. Therefore, it is possible to improve fuel economy.

Further, when such a minimum provisional intake air amount GAIRPRV is determined, searching of the provisional intake air amounts GAIRPRVi is terminated, and no further searching process is performed, which can reduce computational load on the ECU 2. Further, since the preset provisional intake air amount-estimated torque relationship is used for calculation of the most fuel-efficient torque TRQBSFCB, it is possible to easily set the target intake air amount GAIRCMD with small computational load.

Next, a process for setting the target intake air amount GAIRCMD according to a second embodiment will be described with reference to FIGS. 19 to 21. This setting process sets the target intake air amount GAIRCMD while determining a characteristic pattern of the estimated torque characteristic curve.

Figure 19:
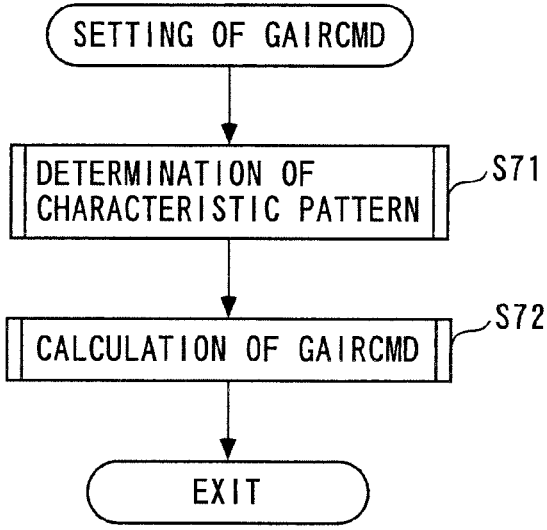
FIG. 19 is a main routine of a process for setting the target intake air amount, according to a second embodiment.

FIG. 19 shows a main routine of the setting process. In the present process, a process for determining to which of the above described first to fourth patterns corresponds the characteristic pattern of the estimated torque characteristic curve is executed (step 71), and then based on the determined characteristic pattern, a process for calculating the target intake air amount GAIRCMD is executed (step 72).

Figure 20:
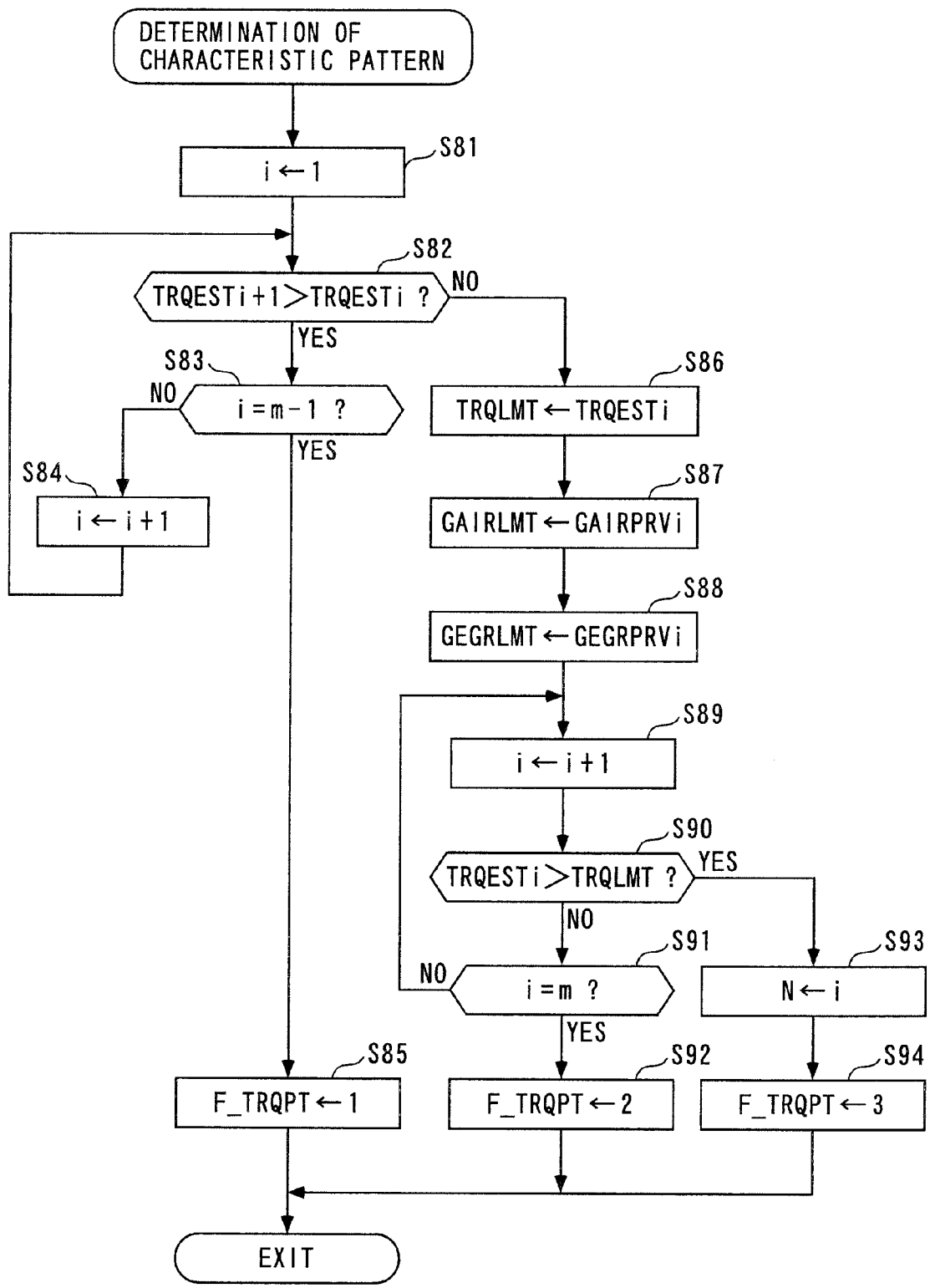
FIG. 20 is a flowchart of a process, as a subroutine, for determining a characteristic pattern.

FIG. 20 shows the process, as a subroutine, for determining a characteristic pattern, which is executed in the above-described step 71. In the present process, first, the index number i is set to 1 (step 81), and it is determined whether or not a next-order estimated torque TRQESTi+1 is larger than the estimated torques TRQESTi associated with the index number i (step 82). If the answer to this question is affirmative (YES), it is determined whether or not the index number i at this time is equal to a value (m−1) calculated by subtracting 1 from the number m of samples (step 83). If the answer to this question is negative (NO), the index number i is incremented (step 84), and then the process returns to the above-described step 82 to perform the above-described determination again.

If the answer to the question of the above-described step 83 becomes affirmative (YES) (i=m−1) with the answer to the question of the step 82 remaining affirmative (YES), i.e. if the relationship of the estimated torque TRQESTi+1> the estimated torque TRQESTi holds between any two provisional intake air amounts GAIRPRVi and GAIRPRVi+1 which are adjacent to each other, it is determined that the characteristic pattern of the estimated torque characteristic curve is the first pattern shown in FIG. 14, and to indicate the fact, a characteristic pattern flag F_TRQPT is set to 1 (step 85), followed by terminating the present process.

On the other hand, if the answer to the question of the above-described step 82 is negative (NO), i.e. if the estimated torque TRQESTi+1≤ the estimated torque TRQESTi holds, it is determined that the estimated torque TRQESTi at this time corresponds to a non-increasing point at which the estimated torque TRQEST ceases to increase even when the provisional intake air amount GAIRPRV increases (the maximum point PMAX in the second pattern or the non-increasing point PNINC in the third pattern), and the estimated torque TRQESTi at this time is set as a limit torque TRQLMT (step 86). Further, the provisional intake air amount GAIRPRVi associated with the estimated torque TRQESTi is set as a limit intake air amount GAIRLMT, and the provisional EGR amount GEGRPRVi associated with the estimated torque TRQESTi is set as a limit EGR amount GEGRLMT (steps 87 and 88).

Next, after incrementing the index number i (step 89), it is determined whether or not the estimated torque TRQESTi is larger than the limit torque TRQLMT set in the above-described step 86 (step 90). If the answer to this question is negative (NO), it is determined whether or not the index number i is equal to the number m of samples (step 91). If the answer to this question is negative (NO), the process returns to the step 89, wherein the index number is incremented to perform the determination in the above-described step 90 again.

If the answer to the question of the above-described step 91 becomes affirmative (YES) (i=m) with the answer to the question of the step 90 remaining negative (NO), i.e. if there is no estimated torque TRQEST larger than the limit torque TRQLMT within the range of the provisional intake air amount GAIRPRV larger than a value corresponding to the non-increasing point, it is determined that the characteristic pattern of the estimated torque characteristic curve is the second or third pattern shown in FIG. 15 or 16, and the characteristic pattern flag F_TRQPT is set to 2 (step 92), followed by terminating the present process.

On the other hand, if the answer to the question of the above-described step 90 is affirmative (YES), i.e. if the estimated torque TRQESTi> the limit torque TRQLMT holds, it is determined that the re-increasing point PRINC exists on the estimated torque characteristic curve, and the characteristic pattern is the fourth pattern shown in FIG. 17. Then, the index number i at this time is stored as a re-increasing point number N (step 93), and the characteristic pattern flag F_TRQPT is set to 3 (step 94), followed by terminating the present process.

Figure 21:
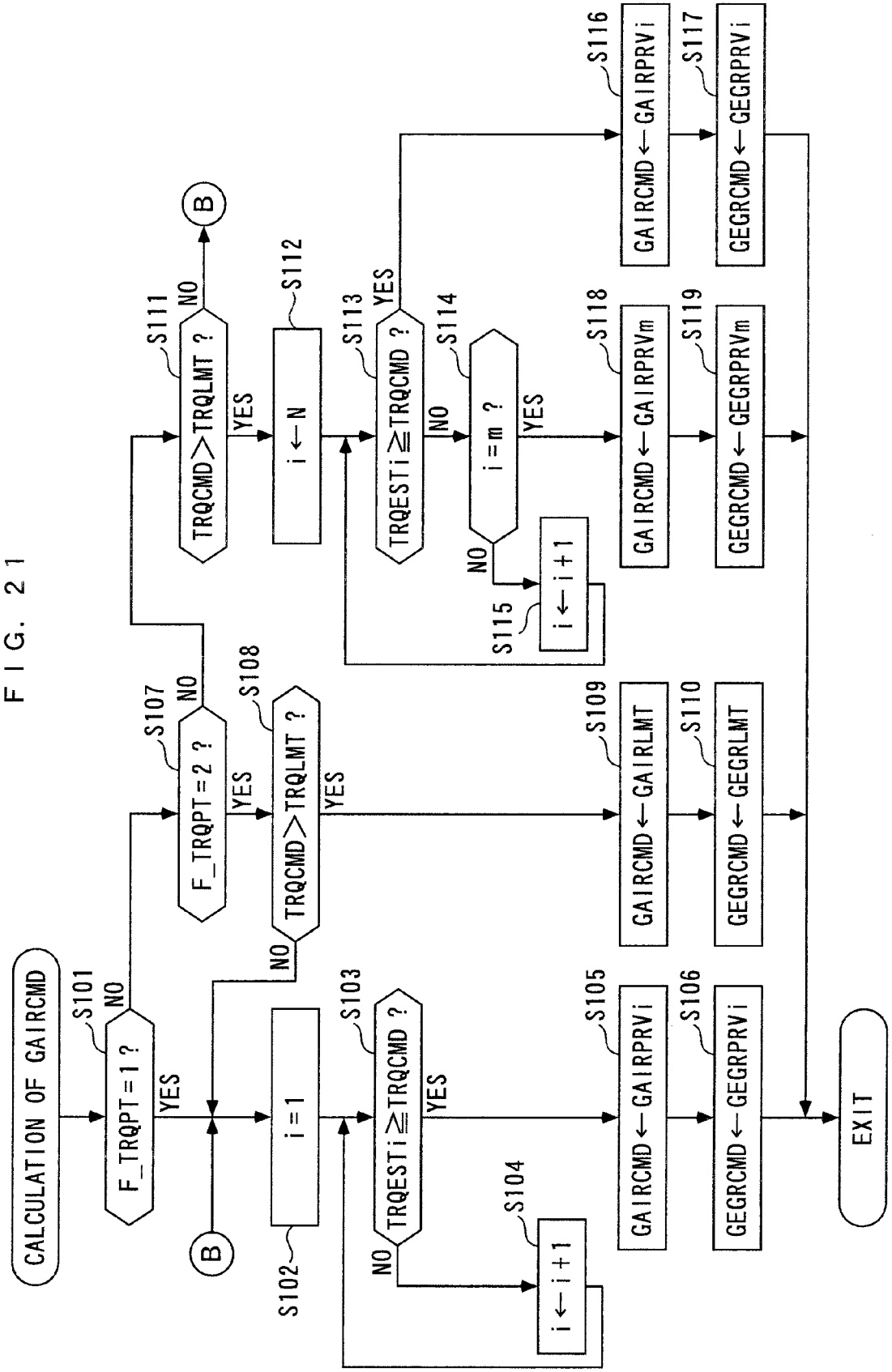
FIG. 21 is a flowchart of a process, as a subroutine, for calculating the target intake air amount.

FIG. 21 shows the process, as a subroutine, for calculating the target intake air amount GAIRCMD, which is executed in the step 72 in FIG. 19. In the present process, first, in a step 101, it is determined whether or not the characteristic pattern flag F_TRQPT is equal to 1. If the answer to this question is affirmative (YES), i.e. if the determined characteristic pattern of the estimated torque characteristic curve is the first pattern, quite the same process as executed in the steps 61 to 65 in FIG. 18 according to the first embodiment is executed in steps 102 to 106 to thereby set the target intake air amount GAIRCMD and the like, followed by terminating the present process.

More specifically, after the index number i is set to 1 (step 102), it is determined whether or not the estimated torque TRQESTi is not smaller than the target torque TRQCMD (step 103). If the answer to this question is negative (NO), the index number i is incremented (step 104) to perform the determination in the step 103 again. If the answer to the question of the step 103 is affirmative (YES), i.e. if the estimated torque TRQESTi≥ the target torque TRQCMD holds, the provisional intake air amount GAIRPRVi at the time is set as the target intake air amount GAIRCMD (step 105), and an associated provisional EGR amount GEGRPRVi is set as the target EGR amount GEGRCMD (step 106). Thus, similarly to the first embodiment, by sequentially searching the provisional intake air amounts GAIRPRVi in an increasing order thereof, it is possible to easily and positively select a minimum provisional intake air amount GAIRPRVi that attains the target torque TRQCMD, and set the same as the target intake air amount GAIRCMD.

If the answer to the question of the step 101 is negative (NO), it is determined whether or not the characteristic pattern flag F_TRQPT is equal to 2 (step 107). If the answer to this question is affirmative (YES), i.e. if the characteristic pattern is the second or third pattern, it is determined whether or not the target torque TRQCMD is larger than the limit torque TRQLMT (step 108). If the answer to this question is negative (NO), i.e. if the target torque TRQCMD≤ the limit torque TRQLMT holds, the process proceeds to the step 102 et seq., wherein similarly to the case of the first pattern, the provisional intake air amounts GAIRPRVi are sequentially searched in an increasing order thereof, to select one of the provisional intake air amounts GAIRPRVi when the estimated torque TRQESTi≥ the target torque TRQCMD holds, and the selected provisional intake air amount GAIRPRVi is set as the target intake air amount GAIRCMD.

On the other hand, if the answer to the question of the above-described step 108 is affirmative (YES), i.e. if the target torque TRQCMD> the limit torque TRQLMT holds, the target intake air amount GAIRCMD is set to the limit intake air amount GAIRLMT set in the step 87 in FIG. 20 (step 109), and the target EGR amount GEGRCMD is set to the limit EGR amount GEGRLMT set in the step 88 (step 110), followed by terminating the present process.

As described above, in the case where the characteristic pattern is the second or third pattern, when the target torque TRQCMD, which is larger than the limit torque TRQLMT corresponding to the maximum point PMAX or the non-increasing point PNINC of the estimated torque TRQEST, is set, the target intake air amount GAIRCMD is limited to the limit intake air amount GAIRLMT associated with the limit torque TRQLMT (parenthesized TRQCMD and GAIRCMD in FIGS. 15 and 16). This prevents setting of the target intake air amount GAIRCMD exceeding the maximum point PMAX or the non-increasing point PNINC, thereby making it possible to effectively avoid consumption of excessive fuel which does not contribute to an increase in the torque of the engine 3, which makes it possible to improve fuel economy.

Further, in the case where the characteristic pattern is the second pattern having the maximum point PMAX, if the intake air amount GAIR is increased beyond the maximum point PMAX, not only fuel is wastefully consumed but also the torque of the engine 3 is reduced, and hence by limiting the target intake air amount GAIRCMD using the above-described the limit intake air amount GAIRLMT, it is possible to effectively prevent reduction of the torque of the engine 3, which makes it possible to enhance drivability.

If the answer to the question of the above-described step 107 is negative (NO), i.e. if the characteristic pattern is the fourth pattern, similarly to the above-described step 108, it is determined whether or not the target torque TRQCMD is larger than the limit torque TRQLMT (step 111). If the answer to this question is negative (NO), i.e. if the target torque TRQCMD≤ the limit torque TRQLMT holds, the process proceeds to the step 102 et seq., wherein similarly to the case of the first pattern, the provisional intake air amounts GAIRPRVi are sequentially searched in an increasing order thereof, to select one of the provisional intake air amounts GAIRPRVi when the estimated torque TRQESTi≥ the target torque TRQCMD holds, and the selected provisional intake air amount GAIRPRVi is set as the target intake air amount GAIRCMD.

If the answer to the question of the above-described step 111 is affirmative (YES), i.e. if the target torque TRQCMD> the limit torque TRQLMT holds, the index number is set to the re-increasing point number N stored in the step 93 in FIG. 20 (step 112), whereafter it is determined whether or not the estimated torque TRQESTi is not smaller than the target torque TRQCMD (step 113). If the answer to this question is negative (NO), it is determined whether or not the index number i is equal to the number m of samples (step 114). If the answer to this question is negative (NO), after the index number i is incremented (step 115), the determination in the step 113 is performed again.

If the answer to the question of the step 113 is affirmative (YES), i.e. if the estimated torque TRQESTi≥ the target torque TRQCMD holds, the provisional intake air amount GAIRPRVi at the time is set as the target intake air amount GAIRCMD (step 116), and an associated one of the provisional EGR amount GEGRPRVi is set as the target EGR amount GEGRCMD (step 117), followed by terminating the present process.

On the other hand, if the answer to the question of the above-described step 114 becomes affirmative (YES) (i=m), i.e. if there is no estimated torque TRQEST not smaller than the target torque TRQCMD within the range of the provisional intake air amount GAIRPRV larger than a value corresponding to the re-increasing point PRINC, the target intake air amount GAIRCMD is set to a provisional intake air amount GAIRPRVm corresponding to the maximum intake air amount GAIRMAX (step 118), and the target EGR amount GEGRCMD is set to the provisional EGR amount GEGRPRVm (step 119), followed by terminating the present process.

As described above, in the case where the characteristic pattern is the fourth pattern, the target torque TRQCMD exceeding the limit torque TRQLMT is set, and when there is an estimated torque TRQEST not smaller than the target torque TRQCMD within the range of the provisional intake air amount GAIRPRV larger than the value corresponding to the re-increasing point PRINC, the target intake air amount GAIRCMD is set to the provisional intake air amounts GAIRPRVi associated with the estimated torque TRQESTi at the time (steps 113 and 116). This makes it possible to properly select a minimum provisional intake air amount GAIRPRVi that attains the target torque TRQCMD, and set the same as the target intake air amount GAIRCMD.

On the other hand, in the above-described case, when there is no estimated torque TRQEST not smaller than the target torque TRQCMD, the target intake air amount GAIRCMD is set to the provisional intake air amount GAIRPRVm corresponding to the maximum intake air amount GAIRMAX (steps 113 and 118). This makes it possible to meet a demand from the driver of the vehicle as much as possible to cause the engine 3 to output a maximum torque.

Figure 22:
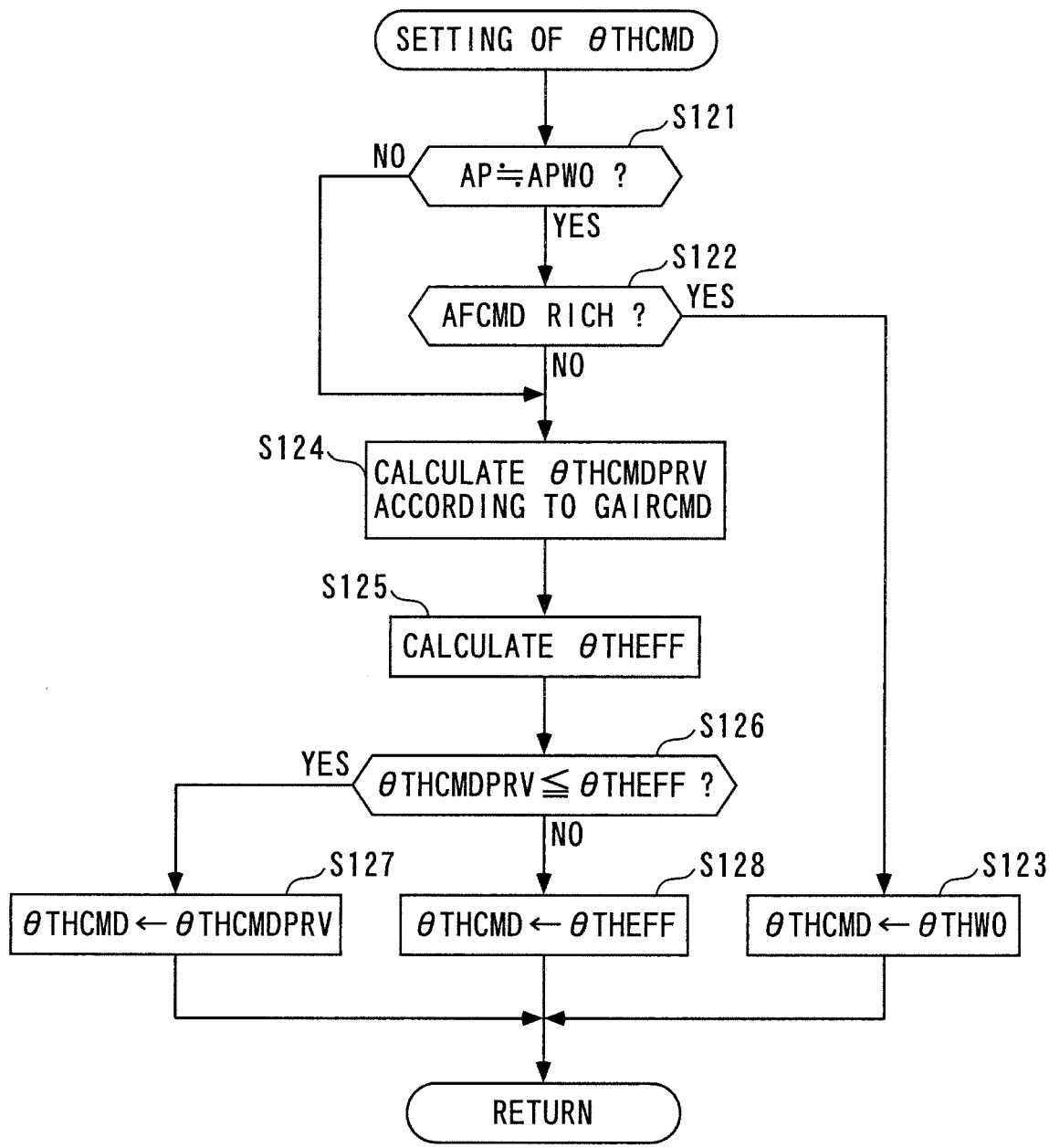
FIG. 22 is a flowchart of a process for setting a target throttle valve opening.

Next, the process for setting the target throttle valve opening θTHCMD, which is executed in the step 5 in FIG. 3, will be described with reference to FIG. 22. The present process is for finally setting the target throttle valve opening θTHCMD according to the target intake air amount GAIRCMD set in the first embodiment (FIG. 18) or the second embodiment (FIG. 21) described hereinabove.

In the present process, first, in a step 121, it is determined whether or not a detected accelerator pedal opening AP is substantially equal to a predetermined fully-open degree APWO. Then, in a step 122, it is determined whether or not the target air-fuel ratio AFCMD is set to a richer value than the stoichiometric air-fuel ratio. If both of the answers to these questions are affirmative (YES), the target throttle valve opening θTHCMD is set to a predetermined wide-open throttle opening θTHWO (step 123), followed by terminating the present process.

As a consequence, when the accelerator pedal opening AP is in a fully-open state, by causing the engine 3 to output the maximum torque according to a driver's demand for acceleration, it is possible to enhance drivability. In this case, under conditions where the target air-fuel ratio AFCMD is set to a richer value than the stoichiometric air-fuel ratio, the safety margin for knock is increased by a cooling effect provided by heat of evaporation of an increased amount of fuel in the combustion chamber, so that even when the target throttle valve opening θTHCMD is set to the wide-open throttle opening θTHWO, there is no fear of occurrence of conspicuous knocking.

On the other hand, if the answer to the question of the above-described step 121 or 122 is negative (NO), a provisional target throttle valve opening θTHCMDPRV, which is a provisional target value of the throttle valve opening θTH, is calculated by searching a predetermined θTHCMDPRV map (not shown) according to the target intake air amount GAIRCMD set in the process in FIG. 18 or 21 and the target engine speed NECMD (step 124).

Then, an effective valve opening θTHEFF of the throttle valve 10a is calculated by searching a predetermined θTHEFF map (not shown) according to the target engine speed NECMD (step 125). The effective valve opening θTHEFF represents a degree of opening of the throttle valve 10a, beyond which the torque of the engine 3 almost ceases to increase, and is defined e.g. as a valve opening corresponding to a torque lower than the torque of the engine 3 during the wide-open throttle of the throttle valve 10a by a predetermined several percent.

Next, it is determined whether or not the calculated provisional target throttle valve opening θTHCMDPRV is not larger than the effective valve opening θTHEFT (step 126). If the answer to this question is affirmative (YES), i.e. if θTHCMDPRV ≤ θTHEFT holds, the target throttle valve opening θTHCMD is set to the provisional target throttle valve opening θTHCMDPRV (step 127), followed by terminating the present process.

On the other hand, if the answer to the question of the step 126 is negative (NO), i.e. if θTHCMDPRV > θTHEFF holds, the target throttle valve opening θTHCMD is limited and set to the effective valve opening θTHEFF (step 128), followed by terminating the present process. This makes it possible to prevent hunting of the throttle valve opening θTH in a range beyond the effective valve opening θTHEFT, and prolong the service lives of the throttle valve 10a and the TH actuator 10b.

Note that the present invention is by no means limited to the embodiments described above, but can be practiced in various forms. For example, although in the above-described embodiments, the fuel consumption ratio parameter PRMBSFC calculated by dividing the provisional intake air amount GAIRPRV by the estimated torque is used as the fuel consumption ratio with respect to a plurality of estimated torques TRQEST, this is not limitative, but other suitable parameters may be employed insofar as they represent the fuel consumption ratio. Alternatively, a provisional fuel consumption amount may be calculated from the provisional intake air amount GAIRPRV and the target air-fuel ratio AFCMD, and the fuel consumption ratio may be directly calculated from the calculated fuel consumption amount and the estimated torques TRQEST.

Further, although in the above-described embodiments, as the method of setting the target engine speed NECMD and the target torque TRQCMD based on the operating line, there is employed a method of once converting the most fuel-efficient torques TRQBSFCB to the most fuel-efficient outputs PWRBSFCB and searching for one of the most fuel-efficient outputs PWRBSFCB which the target output PWRCMD matches, this is not limitative, but for example, an equal output line on which the target output PWRCMD can be obtained, as indicated by a dotted line in FIG. 11, may be drawn on a coordinate plane defined by coordinate axes representing the engine speed NE and the torque TRQ of the engine 3, on which an operating line is indicated, and an engine speed NE and a torque TRQ associated with an intersection of the equal output line and the operating line may be set as the target engine speed NECMD and the target torque TRQCMD (parenthesized NECMD and TRQCMD in FIG. 11).

Furthermore, although in the above-described embodiments, to select the minimum provisional intake air amount GAIRPRV that attains the target torque TRQCMD, the provisional intake air amounts GAIRPRVi are sequentially searched in an increasing order thereof, this is not limitative, but the whole provisional intake air amount-estimated torque relationship may be searched first to thereby select therefrom a minimum provisional intake air amount GAIRPRVi that satisfies the conditions. Further, although in the above-described embodiments, the effective valve opening θTHEFF of the throttle valve 10a is set according to the engine speed NE, this is not limitative, but it may be replaced by a predetermined fixed value.

Further, the number n of samples (n=12) of the reference engine speeds NEREFj and the number m of samples (m=10) of the provisional intake air amount GAIRPRVi in the above-described embodiments are given only by way of example, and it is to be understood that the numbers n and m of samples may be increased or decreased. When the numbers n and m of samples are increased, setting of the provisional intake air amount-estimated torque relationship, calculation of the most fuel-efficient torques TRQBSFCB, setting of the operating line, calculation of the target torque TRQCMD and the target engine speed NECMD, and so forth can be performed in a more fine-grained manner, thereby making it possible to achieve further enhancement of fuel economy.

Further, the methods of calculating the maximum intake air amount GAIRMAX, the estimated retard amount IGRTDEST, the estimated torque TRQEST, and so forth described in the above-described embodiments are given only by way of example, and it is to be understood that any other suitable methods may be employed. Further, it is possible to change details of the construction of the embodiment within the spirit and scope of the present invention.

Furthermore, although in the above-described embodiments, the present invention is applied to the automotive gasoline engine, this is not limitative, but it can be applied to various engines other than the gasoline engine, including a diesel engine, insofar as the air-fuel ratio of the mixture is controlled to a predetermined target air-fuel ratio irrespective of whether the predetermined target air-fuel ratio is the stoichiometric air-fuel ratio. Further, the present invention can be applied to engines other than the engines for vehicles, e.g. engines for ship propulsion machines, such as an outboard motor having a vertically-disposed crankshaft.

Particularly, the present invention can also be applied to an internal combustion engine which is operated at a constant engine speed, e.g. an internal combustion engine used as a generator or a general-purpose internal combustion engine. In this case, similarly to the above-described embodiments, the provisional intake air amount-estimated torque relationship is set by using the rotational speed of the engine as the only reference engine speed NEREF, and out of a plurality of calculated estimated torques TRQESTi, an estimated torque TRQEST which makes it possible to obtain a minimum fuel consumption ratio is calculated as the most fuel-efficient torque TRQBSFCB. Then, by controlling the engine based on the calculated most fuel-efficient torque TRQBSFCB, it is possible to operate the engine with a higher priority given to fuel economy thereof.

It is further understood by those skilled in the art that the foregoing are preferred embodiments of the invention, and that various changes and modifications may be made without departing from the spirit and scope thereof.

What is claimed is:

1. A control system for an internal combustion engine, which calculates a most fuel-efficient torque that minimizes a fuel consumption ratio, and controls the engine based on the calculated most fuel-efficient torque, comprising:
    air-fuel ratio control means for controlling an air-fuel ratio of a mixture burned in a combustion chamber to a predetermined target air-fuel ratio;

most fuel-efficient torque-calculating means for calculating the most fuel-efficient torque generated when the engine is operated at one predetermined reference rotational speed; and a target throttle valve opening means for adjusting a throttle valve opening according to a target intake air amount which depends upon a target torque, wherein the most fuel-efficient torque-calculating means is used to calculate the target torque;

wherein said most fuel-efficient torque-calculating means comprises:

maximum intake air amount-calculating means for calculating, based on operating conditions of the engine, a maximum amount of intake air that can be drawn into the combustion chamber, as a maximum intake air amount, provisional intake air amount-setting means for setting a plurality of provisional intake air amounts different from each other within a range of an intake air amount, which ranges from 0 to the calculated maximum intake air amount, estimated torque-calculating means for calculating, based on the operating conditions of the engine, estimated torques that are estimated to be output from the engine assuming that the set plurality of provisional intake air amounts of intake air are drawn into the combustion chamber, respectively, as a plurality of estimated torques, provisional intake air amount-estimated torque relationship-setting means for setting a provisional intake air amount-estimated torque relationship, which is a relationship between the plurality of provisional intake air amounts and the plurality of calculated estimated torques, and fuel consumption ratio-calculating means for calculating a plurality of fuel consumption ratios associated with the plurality of estimated torques, respectively, based on the set provisional intake air amount-estimated torque relationship, wherein one of the plurality of estimated torques, associated with a minimum fuel consumption ratio of the plurality of calculated fuel consumption ratios, is calculated as the most fuel-efficient torque at the reference rotational speed.

2. The control system according to claim 1, wherein said most fuel-efficient torque-calculating means calculates a plurality of most fuel-efficient torques generated when the engine is operated at a plurality of predetermined reference rotational speeds including the one reference rotational speed, respectively, and wherein said most fuel-efficient torque-calculating means further comprises operating line-setting means for setting an operating line connecting a plurality of operating points, which are respective combinations of the plurality of reference rotational speeds and the plurality of most fuel-efficient torques associated with the plurality of reference rotational speeds, on a coordinate plane defined by coordinate axes representing a rotational speed and a torque of the engine are set as.

3. The control system according to claim 2, further comprising:

target output-setting means for setting a target output of the engine; and target torque-setting means for selecting a combination of a torque and a rotational speed of the engine which satisfy the set target output, based on the operating line, and setting the torque and the rotational speed as a target torque and a target rotational speed.

4. The control system according to claim 3, further comprising target intake air amount-setting means for setting a minimum provisional intake air amount that makes the estimated torque equal to or close to the target torque, as the target intake air amount, by selecting the minimum provisional intake air amount from the provisional intake air amount-estimated torque relationship set with respect to the reference rotational speed associated with the target rotational speed.

5. The control system according to claim 4, wherein said target intake air amount-setting means sequentially searches the plurality of provisional intake air amounts in an increasing order of the provisional intake air amounts based on the provisional intake air amount-estimated torque relationship, for the provisional intake air amount that makes the estimated torque equal to or close to the target torque, and terminates the search of the provisional intake air amounts when the provisional intake air amount that makes the estimated torque equal to or close to the target torque is found, while setting the found provisional intake air amount as the target intake air amount.

6. The control system according to claim 3, further comprising:

estimated torque characteristic curve-setting means for setting an estimated torque characteristic curve representative of characteristics of the plurality of estimated torques with respect to the plurality of provisional intake air amounts, based on the provisional intake air amount-estimated torque relationship set with respect to the reference rotational speed associated with the target rotational speed;

torque non-increase-determining means for determining whether or not there is a non-increasing point at which the estimated torque ceases to increase even when the provisional intake air amount increases, on the set estimated torque characteristic curve;

limit torque-setting means for setting, when it is determined that there is a non-increasing point, the estimated torque corresponding to the non-increasing point as a limit torque; and target intake air amount-setting means for setting, when the target torque is larger than the limit torque, the provisional intake air amount corresponding to the non-increasing point as the target intake air amount.

7. The control system according to claim 6, further comprising torque re-increase-determining means for determining whether or not there is a re-increasing point at which the estimated torque, which increases again, becomes equal to or larger than the limit torque within a range of the provisional intake air amount larger than a value corresponding to the non-increasing point on the estimated torque characteristic curve, and wherein in a case where it is determined that there is the re-increasing point, when the target torque is larger than the limit torque, said target intake air amount-setting means sets the provisional intake air amount larger than a value corresponding to the re-increasing point as the target intake air amount in place of the provisional intake air amount corresponding to the non-increasing point.

8. The control system according to claim 4, further comprising:

provisional target throttle valve opening-calculating means for calculating a provisional target throttle valve opening, which is a provisional target of an opening degree of the throttle valve for adjusting the intake air amount, according to the target intake air amount; and target throttle valve opening-setting means for setting a target throttle valve opening, which is a final target value of the opening degree of the throttle valve, to the provisional target throttle valve opening, when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

9. The control system according to claim 5, further comprising:
provisional target throttle valve opening-calculating means for calculating a provisional target throttle valve opening, which is a provisional target of an opening degree of the throttle valve for adjusting the intake air amount, according to the target intake air amount; and
target throttle valve opening-setting means for setting a target throttle valve opening, which is a final target value of the opening degree of the throttle valve, to the provisional target throttle valve opening, when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

10. The control system according to claim 6, further comprising:
provisional target throttle valve opening-calculating means for calculating a provisional target throttle valve opening, which is a provisional target of an opening degree of the throttle valve for adjusting the intake air amount, according to the target intake air amount; and
target throttle valve opening-setting means for setting a target throttle valve opening, which is a final target value of the opening degree of the throttle valve, to the provisional target throttle valve opening, when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

11. The control system according to claim 7, further comprising:
provisional target throttle valve opening-calculating means for calculating a provisional target throttle valve opening, which is a provisional target of an opening degree of a throttle valve for adjusting the intake air amount, according to the target intake air amount; and
target throttle valve opening-setting means for setting a target throttle valve opening, which is a final target value of the opening degree of the throttle valve, to the provisional target throttle valve opening, when the calculated provisional target throttle valve opening is equal to or smaller than an effective valve opening, which is an opening degree of the throttle valve beyond which torque of the engine almost ceases to increase, and setting the target throttle valve opening, when the provisional target throttle valve opening is larger than the effective valve opening, by limiting the target throttle valve opening to the effective valve opening.

12. The control system according to claim 8, wherein the engine is installed on a vehicle as a motive power source,
the control system further comprising accelerator pedal opening-detecting means for detecting a degree of opening of an accelerator pedal of the vehicle,
wherein when the detected degree of opening of the accelerator pedal is in a fully-open state, and also the target air-fuel ratio is set to a richer value than a stoichiometric air-fuel ratio, said target throttle valve opening-setting means sets the target throttle valve opening to a predetermined wide-open throttle opening.

13. The control system according to claim 9, wherein the engine is installed on a vehicle as a motive power source,
the control system further comprising accelerator pedal opening-detecting means for detecting a degree of opening of an accelerator pedal of the vehicle,
wherein when the detected degree of opening of the accelerator pedal is in a fully-open state, and also the target air-fuel ratio is set to a richer value than a stoichiometric air-fuel ratio, said target throttle valve opening-setting means sets the target throttle valve opening to a predetermined wide-open throttle opening.

14. The control system according to claim 10, wherein the engine is installed on a vehicle as a motive power source,
the control system further comprising accelerator pedal opening-detecting means for detecting a degree of opening of an accelerator pedal of the vehicle,
wherein when the detected degree of opening of the accelerator pedal is in a fully-open state, and also the target air-fuel ratio is set to a richer value than a stoichiometric air-fuel ratio, said target throttle valve opening-setting means sets the target throttle valve opening to a predetermined wide-open throttle opening.

15. The control system according to claim 11, wherein the engine is installed on a vehicle as a motive power source,
the control system further comprising accelerator pedal opening-detecting means for detecting a degree of opening of an accelerator pedal of the vehicle,
wherein when the detected degree of opening of the accelerator pedal is in a fully-open state, and also the target air-fuel ratio is set to a richer value than a stoichiometric air-fuel ratio, said target throttle valve opening-setting means sets the target throttle valve opening to a predetermined wide-open throttle opening.

16. The control system according to claim 1, further comprising:
knocking-detecting means for detecting a state of occurrence of knocking in the engine; and
estimated retard amount-calculating means for calculating an estimated retard amount in ignition timing according to the detected state of occurrence of knocking,
wherein said estimated torque-calculating means calculates the estimated torque according to the calculated estimated retard amount of the ignition timing.

* * * * *